US011763994B2

(12) United States Patent
Tanaka

(10) Patent No.: US 11,763,994 B2
(45) Date of Patent: Sep. 19, 2023

(54) MULTILAYER CERAMIC CAPACITOR

(71) Applicant: Murata Manufacturing Co., Ltd., Nagaokakyo (JP)

(72) Inventor: Yuichiro Tanaka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 27 days.

(21) Appl. No.: 17/666,605

(22) Filed: Feb. 8, 2022

(65) Prior Publication Data
US 2022/0270826 A1 Aug. 25, 2022

(30) Foreign Application Priority Data

Feb. 24, 2021 (JP) ................. 2021-027849

(51) Int. Cl.
*H01G 4/30* (2006.01)
*H01G 4/012* (2006.01)
*H01G 4/008* (2006.01)
*H01G 4/12* (2006.01)

(52) U.S. Cl.
CPC .............. *H01G 4/30* (2013.01); *H01G 4/008* (2013.01); *H01G 4/012* (2013.01); *H01G 4/1218* (2013.01)

(58) Field of Classification Search
CPC ............ H01G 4/30; H01G 4/12; H01G 4/248; H01G 4/012; H01G 4/1209; H01G 4/232; H01G 4/0085; H01G 4/1227; H01G 4/2325; H01G 4/008; H01G 4/1218
See application file for complete search history.

(56) References Cited

U.S. PATENT DOCUMENTS

| 5,712,758 A * | 1/1998 | Amano | ................ | H01G 4/2325 361/306.3 |
| 2013/0250480 A1* | 9/2013 | Ahn | ....................... | H01G 4/129 156/89.12 |
| 2014/0002950 A1* | 1/2014 | Gu | ......................... | H01G 4/005 29/25.42 |
| 2014/0376155 A1 | 12/2014 | Omori et al. | | |
| 2015/0085422 A1* | 3/2015 | Kim | ...................... | H01G 4/2325 156/89.18 |
| 2015/0213959 A1 | 7/2015 | Omori et al. | | |
| 2016/0039711 A1* | 2/2016 | Miyazaki | ................. | H01G 4/30 252/519.51 |
| 2019/0131076 A1* | 5/2019 | Fukumura | .............. | H01G 4/232 |

FOREIGN PATENT DOCUMENTS

| JP | 08-306580 A | 11/1996 |
| WO | 2013/140903 A1 | 9/2013 |
| WO | 2014/057751 A1 | 4/2014 |

* cited by examiner

*Primary Examiner* — Michael P McFadden
(74) *Attorney, Agent, or Firm* — KEATING & BENNETT, LLP

(57) ABSTRACT

In a multilayer ceramic capacitor, a proportion of a glass component in a first side surface-side base electrode layer is about 60% or more in a first range from a tip in a vicinity of a second end surface of the first side surface-side base electrode layer to a position of a length which is about 10% of a dimension in a length direction of the first side surface-side base electrode layer, and a proportion of a glass component in a second side surface-side base electrode layer is about 60% or more in a second range from a tip in a vicinity of a first end surface of the second side surface-side base electrode layer to a position of a length which is about 10% of a dimension in a length direction of the second side surface-side base electrode layer.

18 Claims, 13 Drawing Sheets

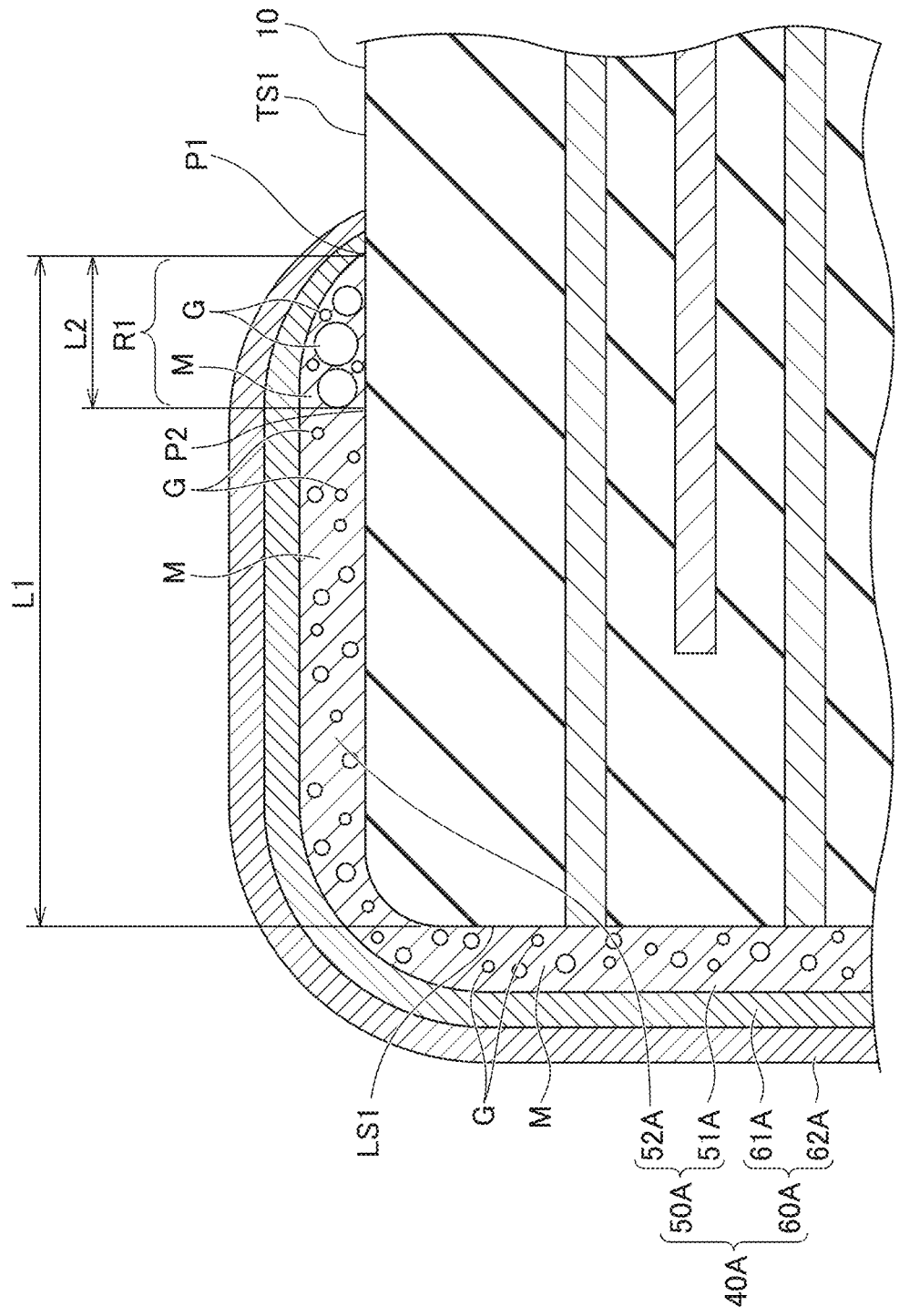

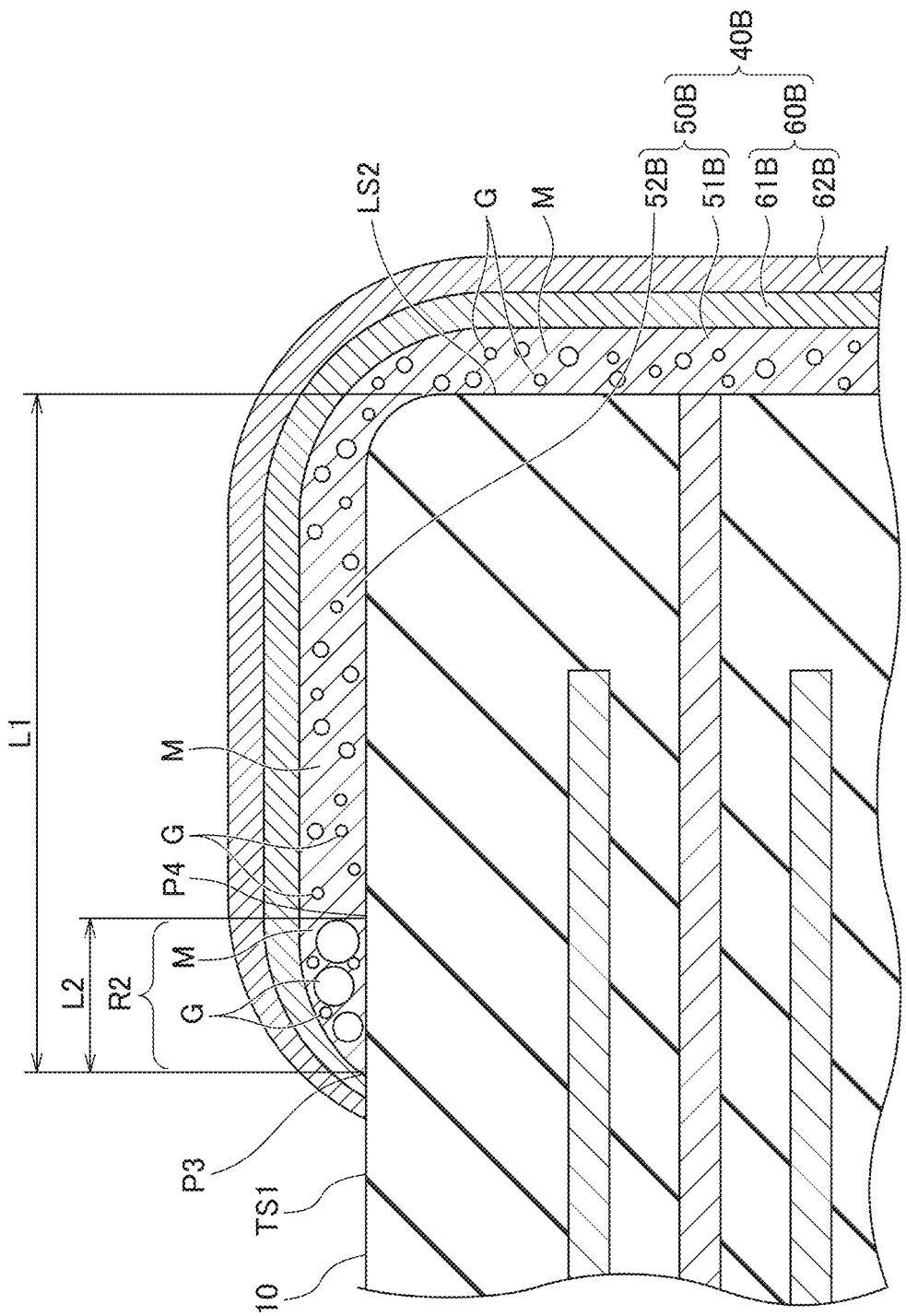

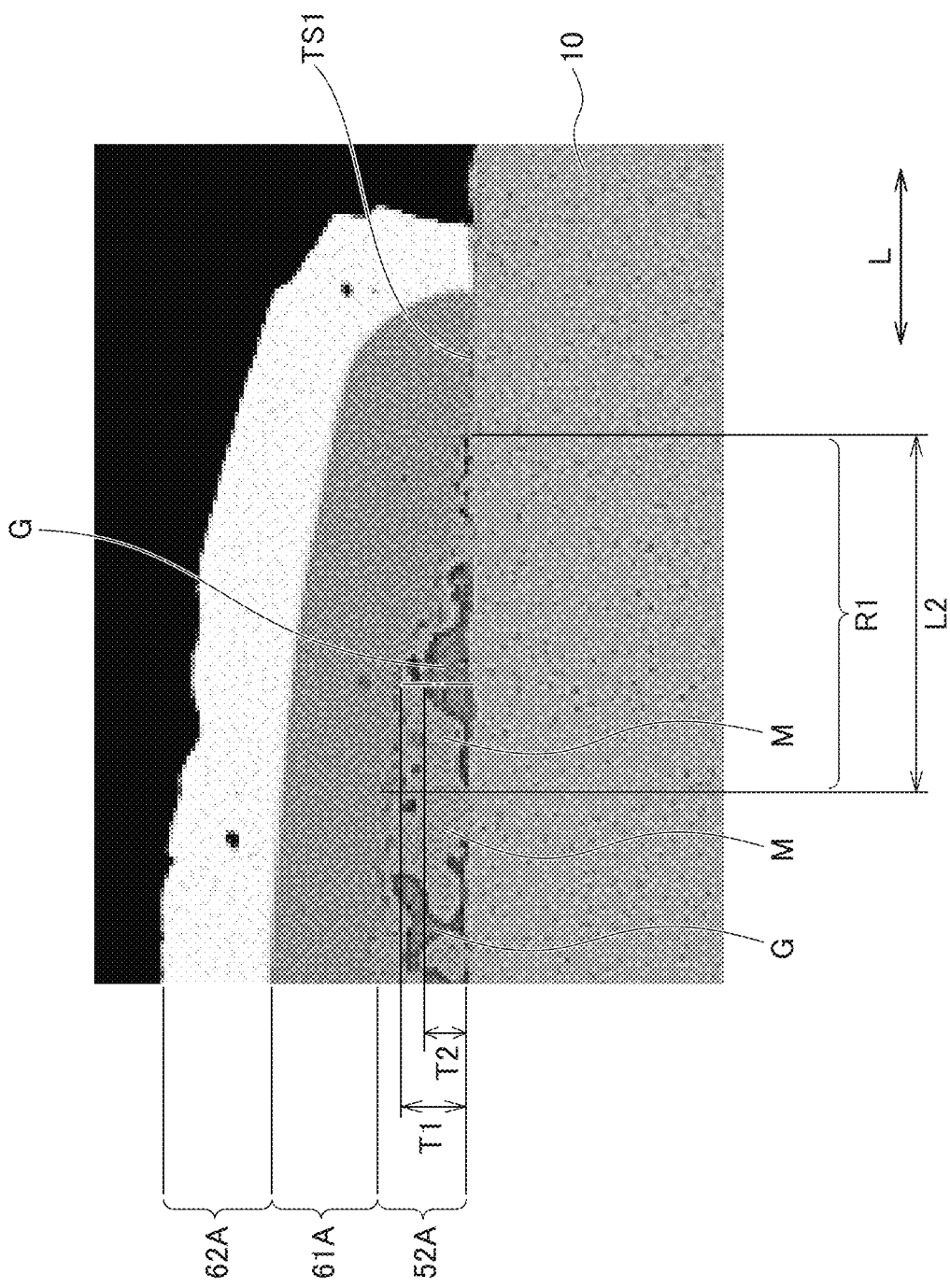

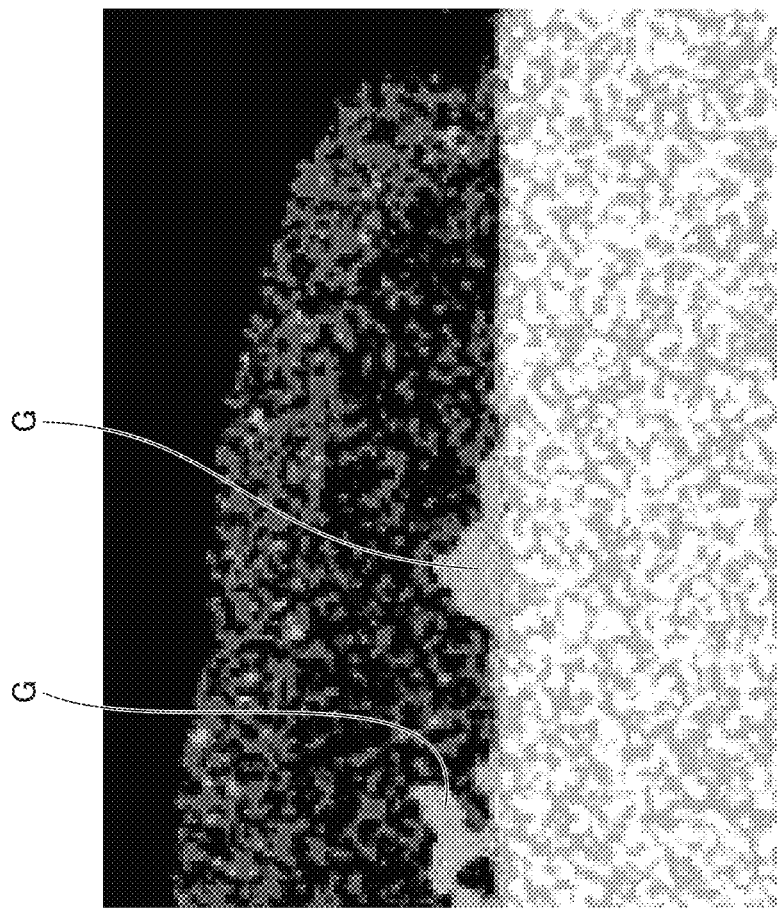

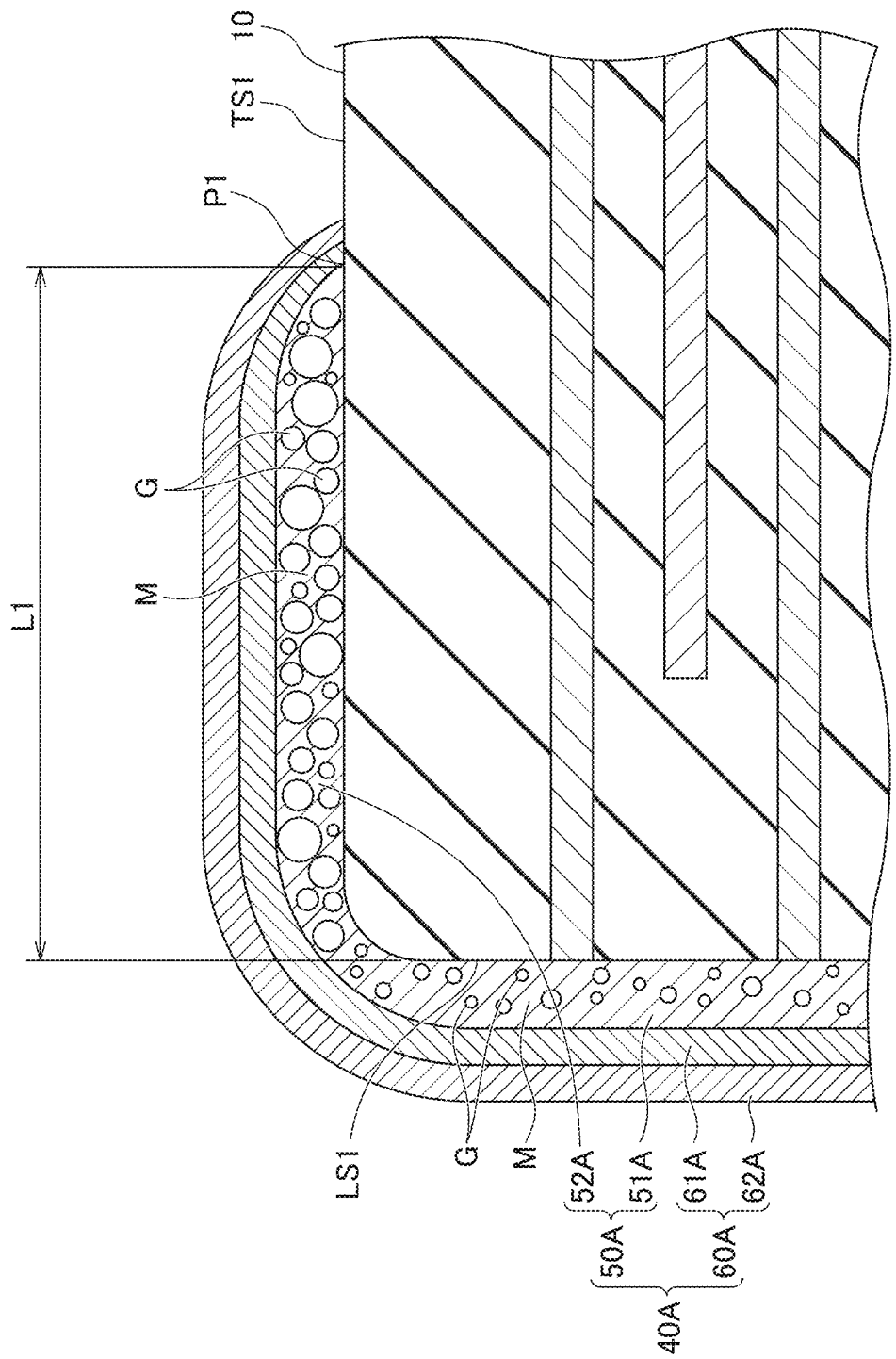

MULTILAYER CERAMIC CAPACITOR

CROSS REFERENCE TO RELATED APPLICATIONS

This application claims the benefit of priority to Japanese Patent Application No. 2021-027849 filed on Feb. 24, 2021. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, multilayer ceramic capacitors have been known. In general, a multilayer ceramic capacitor includes a ceramic sintered body made of a dielectric ceramic such as barium titanate. Inside the ceramic sintered body, a plurality of internal electrodes are laminated with ceramic layers interposed therebetween. Furthermore, on one end surface and the other end surface of the ceramic sintered body, the external electrodes are respectively provided so as to be electrically connected to the internal electrodes (for example, see Japanese Unexamined Patent Application Publication No. H08-306580).

However, in the multilayer ceramic capacitor as described in Japanese Unexamined Patent Application Publication No. H08-306580, stress may be applied to the ceramic sintered body near the tip of the external electrode due to thermal expansion, impact or other factors. In such a case, cracks may occur in the ceramic sintered body of the multilayer body, starting from the vicinity of the tip portion of the external electrode.

SUMMARY OF THE INVENTION

Preferred embodiments of the present invention provide multilayer ceramic capacitors that are each able to reduce or prevent cracks from occurring in a multilayer body.

A multilayer ceramic capacitor according to a preferred embodiment of the present invention includes a multilayer body including a plurality of laminated dielectric layers, the multilayer body further including a first side surface and a second side surface opposing each other in a height direction, a third side surface and a fourth side surface opposing each other in a width direction perpendicular or substantially perpendicular to the height direction, and a first end surface and a second end surface opposing each other in a length direction perpendicular or substantially perpendicular to the height direction and the width direction, first internal electrode layers provided on the plurality of dielectric layers and exposed at the first end surface, second internal electrode layers provided on the plurality of dielectric layers and exposed at the second end surface, a first external electrode connected to the first internal electrode layers and provided in a vicinity of the first end surface, and a second external electrode connected to the second internal electrode layers and provided in a vicinity of the second end surface, in which the first external electrode includes a first base electrode layer including a metal component and a glass component, and a first plated layer provided on the first base electrode layer, the second external electrode includes a second base electrode layer including a metal component and a glass component, and a second plated layer on the second base electrode layer, the first base electrode layer includes a first end surface-side base electrode layer on the first end surface, and a first side surface-side base electrode layer on a portion in a vicinity of the first end surface, of at least one of the first to fourth side surfaces, the second base electrode layer includes a second end surface-side base electrode layer on the second end surface, and a second side surface-side base electrode layer on a portion in a vicinity of the second end surface, of at least one of the first to fourth side surfaces, a proportion of the glass component in the first side surface-side base electrode layer is about 60% or more in a first range from a tip in a vicinity of the second end surface of the first side surface-side base electrode layer to a position of a length which is about 10% of a dimension in the length direction of the first side surface-side base electrode layer, and a proportion of the glass component in the second side surface-side base electrode layer is about 60% or more in a second range from a tip in a vicinity of the first end surface of the second side surface-side base electrode layer to a position of a length which is about 10% of a dimension in the length direction of the second side surface-side base electrode layer.

According to preferred embodiments of the present disclosure, it is possible to provide multilayer ceramic capacitors that are each able to reduce or prevent cracks from occurring in the multilayer body.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5A is an enlarged view of a VA portion of the multilayer ceramic capacitor shown in FIG. 2, and is an enlarged cross-sectional view schematically showing a cross section of an external electrode.

FIG. 5B is an enlarged view of a VB portion of the multilayer ceramic capacitor shown in FIG. 2, and is an enlarged cross-sectional view schematically showing a cross section of an external electrode.

FIG. 6A is a microscopic image by SEM of a cross section of an external electrode according to a preferred embodiment of the present invention.

FIG. 6B is an element mapping image of Ti by EDX of a cross section of an external electrode according to the first preferred embodiment of the present invention.

FIG. 7 is an enlarged sectional view schematically showing a cross section of an external electrode of a multilayer ceramic capacitor of a second preferred embodiment of the present invention, and corresponding to FIG. 5A.

DETAILED DESCRIPTION OF THE PREFERRED EMBODIMENTS

First Preferred Embodiment

Figure 1:
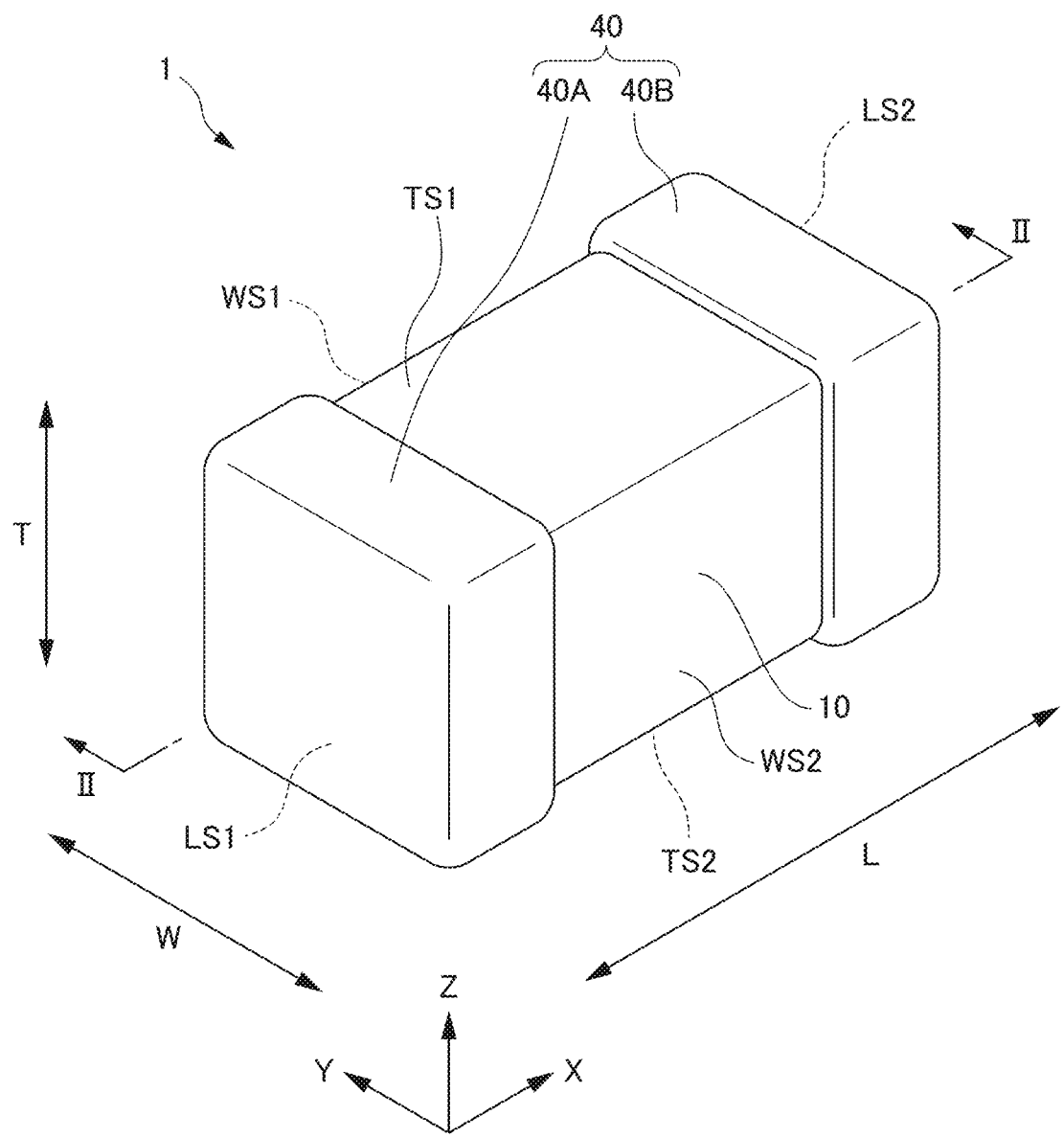
FIG. 1 is an external perspective view of a multilayer ceramic capacitor according to a first preferred embodiment of the present invention.
Figure 2:
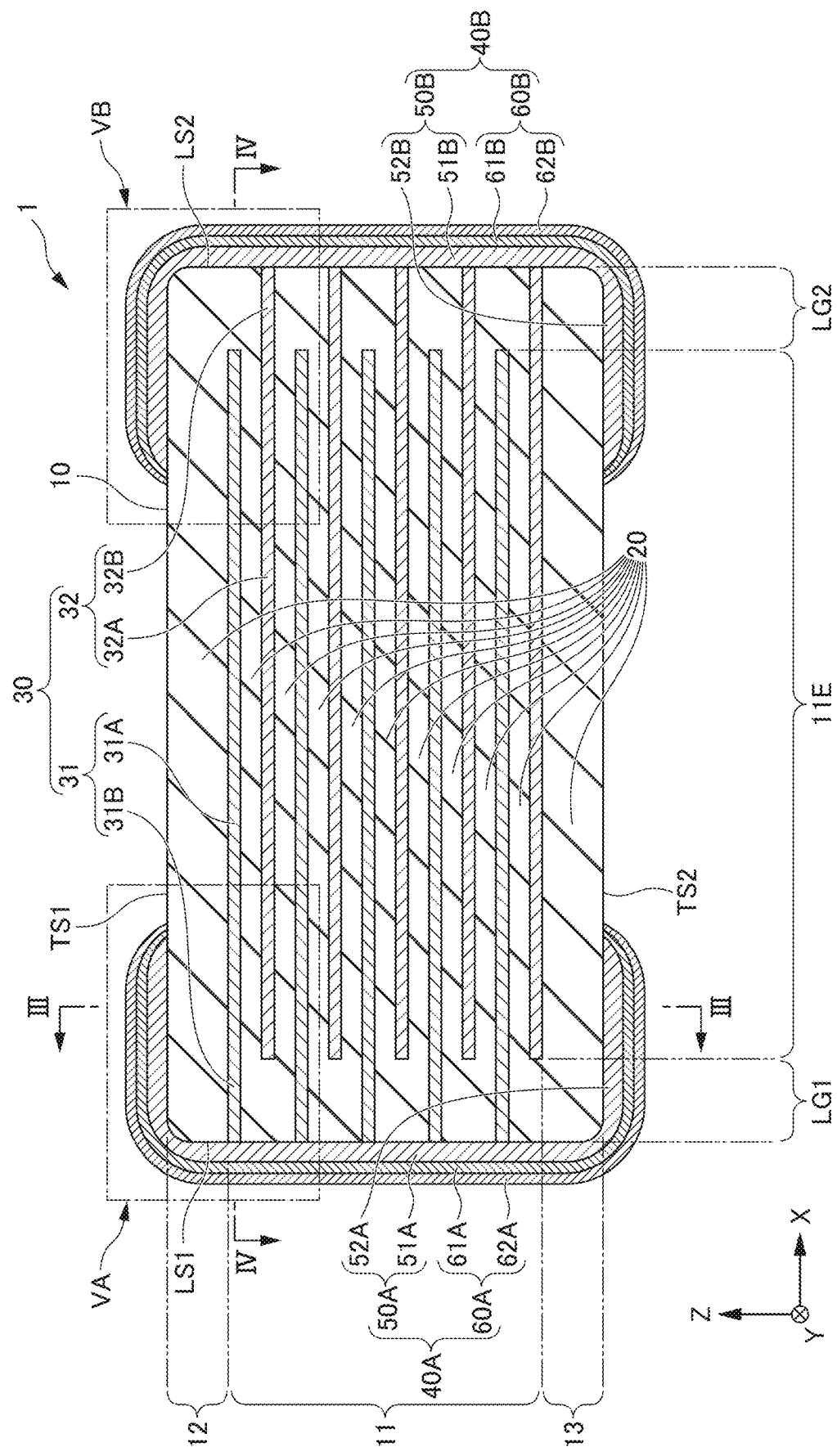
FIG. 2 is a cross-sectional view taken along the line II-II of the multilayer ceramic capacitor shown in FIG. 1.
Figure 3:
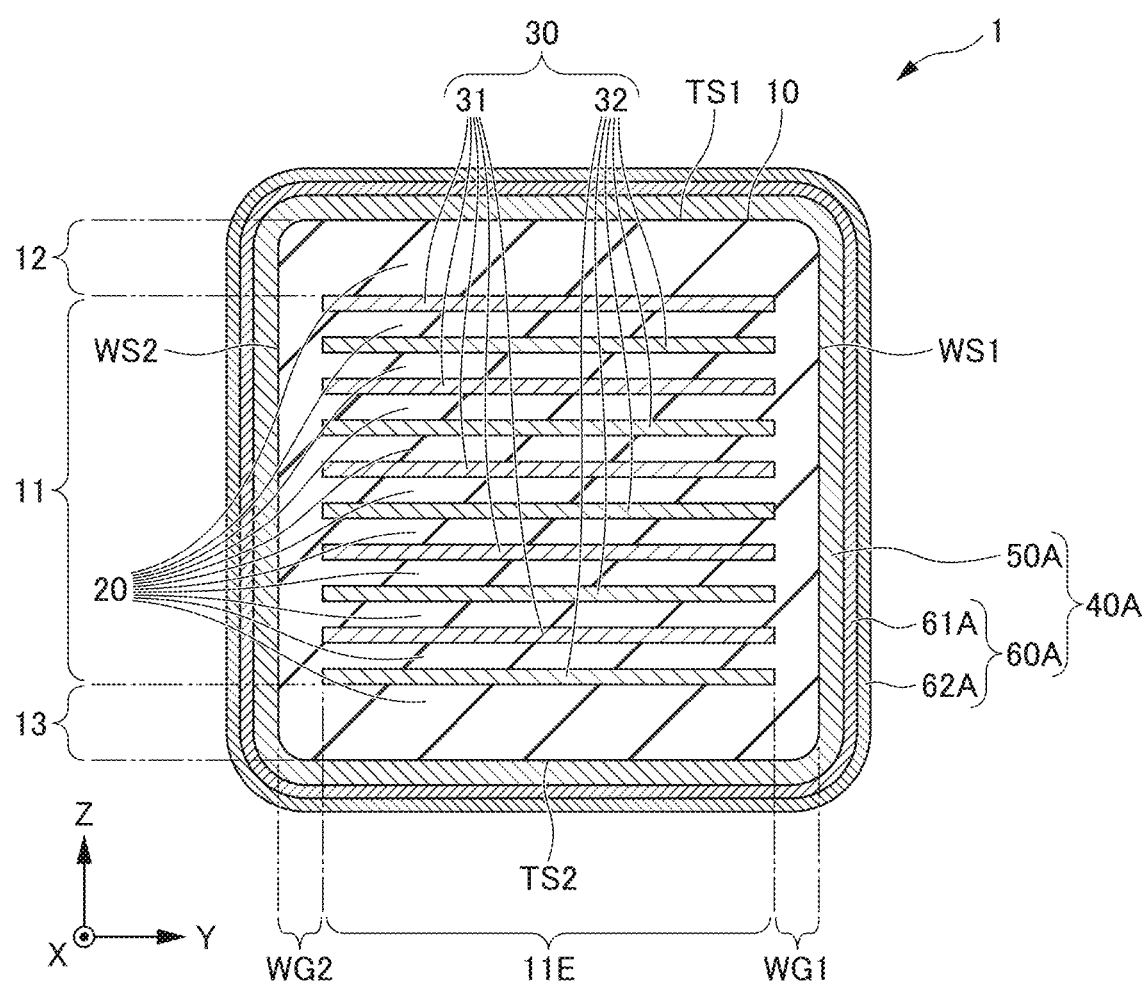
FIG. 3 is a cross-sectional view taken along the line III-III of the multilayer ceramic capacitor shown in FIG. 2.
Figure 4:
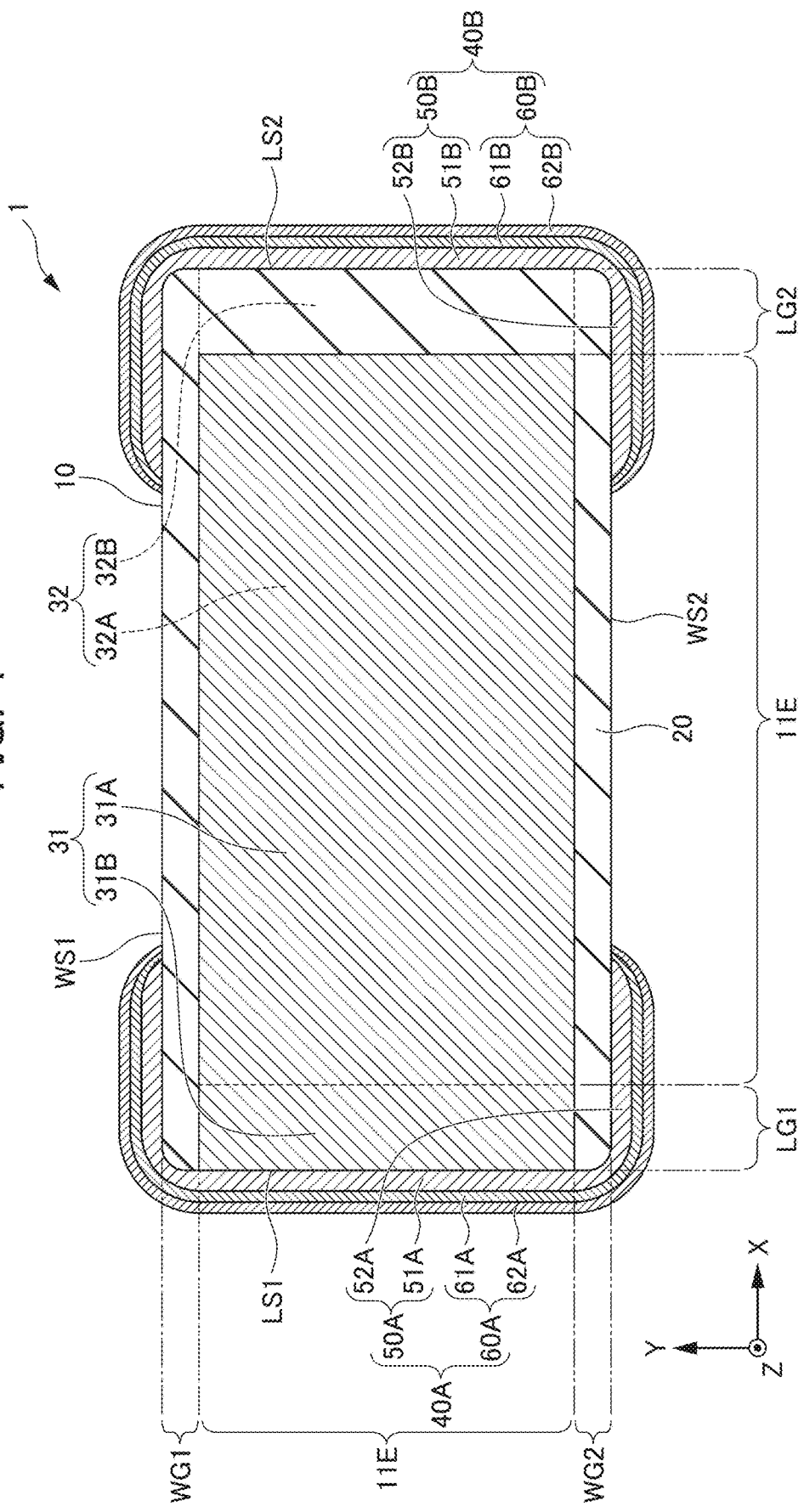
FIG. 4 is a cross-sectional view taken along the line IV-IV of the multilayer ceramic capacitor shown in FIG. 2.

Hereinafter, a multilayer ceramic capacitor 1 according to a first preferred embodiment of the present invention will be described. FIG. 1 is an external perspective view of a multilayer ceramic capacitor 1 according to the first preferred embodiment. FIG. 2 is a cross-sectional view taken along the line II-II of the multilayer ceramic capacitor 1 shown in FIG. 1. FIG. 3 is a cross-sectional view taken along the line of the multilayer ceramic capacitor 1 shown in FIG. 2. FIG. 4 is a cross-sectional view taken along the line IV-IV of the multilayer ceramic capacitor 1 shown in FIG. 2.

The multilayer ceramic capacitor 1 includes a multilayer body 10 and external electrodes 40.

The XYZ Cartesian coordinate system is shown in FIGS. 1 to 4. A length direction L of the multilayer ceramic capacitor 1 and the multilayer body 10 corresponds to the X direction. A width direction W of the multilayer ceramic capacitor 1 and the multilayer body 10 corresponds to the Y direction. A height direction T of the multilayer ceramic capacitor 1 and the multilayer body 10 corresponds to the Z direction. Here, the cross section shown in FIG. 2 is also referred to as an LT cross section. The cross section shown in FIG. 3 is also referred to as a WT cross section. The cross section shown in FIG. 4 is also referred to as an LW cross section.

As shown in FIGS. 1 to 4, the multilayer body 10 includes a first side surface TS1 and a second side surface TS2 opposing in the height direction T, a third side surface WS1 and a fourth side surface WS2 opposing in the width direction W perpendicular or substantially perpendicular to the height direction T, and a first end surface LS1 and a second end surface LS2 opposing in the length direction L perpendicular or substantially perpendicular to the height direction T and the width direction W.

As shown in FIG. 1, the multilayer body 10 has a rectangular or substantially rectangular parallelepiped shape. The dimension of the multilayer body 10 in the length direction L is not necessarily longer than the dimension of the width direction W. The corners and ridges of the multilayer body 10 are preferably rounded. The corners are portions where the three surfaces of the multilayer body intersect, and the ridges are portions where the two surfaces of the multilayer body intersect. Unevenness or the like may be provided on a portion or the entirety of the surface constituting the multilayer body 10.

The dimension of the multilayer body 10 is not particularly limited.

As shown in FIGS. 2 and 3, the multilayer body 10 includes an inner layer portion 11, and a first side surface-side outer layer portion 12 and a second side surface-side outer layer portion 13 that sandwich the inner layer portion 11 in the height direction T.

The inner layer portion 11 includes a plurality of dielectric layers 20 and a plurality of internal electrode layers 30. The inner layer portion 11 includes, in the height direction T, from the internal electrode layer 30 located closest to the first side surface TS1 to the internal electrode layer 30 located closest to the second side surface TS2. In the inner layer portion 11, a plurality of internal electrode layers 30 are opposed to each other with the dielectric layer 20 interposed therebetween. The inner layer portion 11 generates a capacitance and defines and functions as a capacitor.

The plurality of dielectric layers 20 are each made of a dielectric material. The dielectric material may be, for example, a dielectric ceramic including a component such as $BaTiO_3$, $CaTiO_3$, $SrTiO_3$, or $CaZrO_3$. Furthermore, the dielectric material may be obtained by adding a secondary component such as, for example, a Mn compound, an Fe compound, a Cr compound, a Co compound, or a Ni compound to the main component.

The thicknesses of the dielectric layers 20 are each preferably about 0.5 μm or more and about 10 μm or less, for example. The number of the dielectric layers 20 to be laminated (stacked) is preferably fifteen or more and 700 or less, for example. It should be noted that the number of the dielectric layers 20 refers to the total number of dielectric layers in the inner layer portion 11, and dielectric layers in the first side surface-side outer layer portion 12 and the second side surface-side outer layer portion 13.

The plurality of internal electrode layers 30 each include a first internal electrode layer 31 and a second internal electrode layer 32. The plurality of first internal electrode layers 31 are each provided on the dielectric layer 20. The plurality of second internal electrode layers 32 are each provided on the dielectric layer 20. The plurality of first internal electrode layers 31 and the plurality of second internal electrode layers 32 are alternately provided in the height direction T of the multilayer body 10 with the dielectric layers 20 interposed therebetween. The first internal electrode layers 31 and the second internal electrode layers 32 each sandwich the dielectric layers 20.

The first internal electrode layer 31 includes a first opposing portion 31A facing the second internal electrode layer 32, and a first lead-out portion 31B extending from the first opposing portion 31A to the first end surface LS1. The first lead-out portion 31B is exposed at the first end surface LS1.

The second internal electrode layer 32 includes a second opposing portion 32A facing the first internal electrode layer 31, and a second lead-out portion 32B extending from the second opposing portion 32A to the second end surface LS2. The second lead-out portion 32B is exposed at the second end surface LS2.

In the present preferred embodiment, the first opposing portion 31A and the second opposing portion 32A are opposed to each other with the dielectric layers 20 interposed therebetween, such that a capacitance is generated, and the characteristics of a capacitor are provided.

The shapes of the first opposing portion 31A and the second opposing portion 32A are not particularly limited. However, they are preferably, for example rectangular or substantially rectangular. However, the corners of the rectangular or substantially rectangular shape may be rounded, or the corners of the rectangular or substantially rectangular shape may be provided obliquely. The shapes of the first lead-out portion 31B and the second lead-out portion 32B are not particularly limited. However, they are preferably, for example, rectangular or substantially rectangular. However, the corners of the rectangular or substantially rectangular shape may be rounded, or the corners of the rectangular or substantially rectangular shape may be provided obliquely.

The dimension in the width direction W of the first opposing portion 31A may be the same or substantially the same as the dimension in the width direction W of the first lead-out portion 31B, or either of them may be smaller. The dimension in the width direction W of the second opposing portion 32A may be the same or substantially the same as the dimension in the width direction W of the second lead-out portion 32B, or either of them may be smaller.

The first internal electrode layer 31 and the second internal electrode layer 32 are each made of an appropriate conductive material including, for example, a metal such as Ni, Cu, Ag, Pd, and Au, and an alloy including at least one of these metals. When using an alloy, the first internal electrode layer 31 and the second internal electrode layer 32 may be made of, for example, a Ag—Pd alloy or the like.

The thickness of each of the first internal electrode layers 31 and the second internal electrode layers 32 is preferably, for example, about 0.2 μm or more and about 2.0 μm or less. The total number of the first internal electrode layers 31 and the second internal electrode layers 32 is preferably fifteen or more and 200 or less, for example.

The first side surface-side outer layer portion 12 is located in the vicinity of the first side surface TS1 of the multilayer body 10. The first side surface-side outer layer portion 12 includes a plurality of dielectric layers 20 located between the first side surface TS1 and the internal electrode layer 30 closest to the first side surface TS1. The dielectric layers 20 used in the first side surface-side outer layer portion 12 may be the same as the dielectric layers 20 used in the inner layer portion 11.

The second side surface-side outer layer portion 13 is located in the vicinity of the second side surface TS2 of the multilayer body 10. The second side surface-side outer layer portion 13 includes a plurality of dielectric layers 20 located between the second side surface TS2 and the internal electrode layer 30 closest to the second side surface TS2. The dielectric layers 20 used in the second side surface-side outer layer portion 13 may be the same as the dielectric layers 20 used in the inner layer portion 11.

The multilayer body 10 includes a counter electrode portion 11E. The counter electrode portion 11E refers to a portion where the first opposing portion 31A of the first internal electrode layer 31 and the second opposing portion 32A of the second internal electrode layer 32 face each other. The counter electrode portion 11E defines and functions as a portion of the inner layer portion 11. FIG. 4 shows the range of the counter electrode portion 11E in the width direction W and in the length direction L. The counter electrode portion 11E is also referred to as a capacitor active portion.

In addition, the multilayer body 10 includes a third side surface-side outer layer portion WG1 and a fourth side surface-side outer layer portion WG2. The third side surface-side outer layer portion WG1 is a portion including the dielectric layer 20 located between the counter electrode portion 11E and the third side surface WS1. The fourth side surface-side outer layer portion WG2 is a portion including the dielectric layer 20 located between the counter electrode portion 11E and the fourth side surface WS2. FIGS. 3 and 4 each show the ranges of the third side surface-side outer layer portion WG1 and the fourth side surface-side outer layer portion WG2 in the width direction W. The third side surface-side outer layer portions WG1 and the fourth side surface-side outer layer portion WG2 are also each referred to as a W gap or a side gap.

The multilayer body 10 includes a first end surface-side outer layer portion LG1 and a second end surface-side outer layer portion LG2. The first end surface-side outer layer portion LG1 is a portion including the dielectric layer 20 located between the counter electrode portion 11E and the first end surface LS1. The second end surface-side outer layer portion LG2 is a portion including the dielectric layer 20 located between the counter electrode portion 11E and the second end surface LS2. FIGS. 2 and show the ranges in the length directions L of the first end surface side outer layer portion LG1 and the second end surface side outer layer portion LG2. The end surface-side outer layer portion LG1 and the end surface-side outer layer portion LG2 are also each referred to as an L gap or an end gap.

The external electrodes 40 include a first external electrode 40A provided in the vicinity of the first end surface LS1 and a second external electrode 40B provided in the vicinity of the second end surface LS2.

The first external electrode 40A is connected to the first internal electrodes layers 31. The first external electrode 40A is provided on the first end surface LS1. The first external electrode 40A is provided on a portion in the vicinity of the first end surface LS1, of at least one of the four side surfaces TS1, TS2, WS1, and WS2. In other words, the first external electrode 40A is provided on a portion in the vicinity of the first end surface LS1, of at least one among the first side surface TS1, the second side surface TS2, the third side surface WS1, and the fourth side surface WS2.

In the present preferred embodiment, the first external electrode 40A is provided on portions in the vicinity of the first end surface LS1, of all of the first side surface TS1, the second side surface TS2, the third side surface WS1, and the fourth side surface WS2. In other words, in the present preferred embodiment, the first external electrode 40A extends from the first end surface LS1 to a portion of the first side surface TS1, a portion of the second side surface TS2, a portion of the third side surface WS1, and a portion of the fourth side surface WS2.

The second external electrode 40B is connected to the second internal electrodes layers 32. The second external electrode 40B is provided on the second end surface LS2. The second external electrode 40B is provided on a portion in the vicinity of the second end surface LS2, of at least one of the four side surfaces TS1, TS2, WS1, and WS2. In other words, the second external electrode 40B is provided on a portion in the vicinity of the second end surface LS2, of at least one among the first side surface TS1, the second side surface TS2, the third side surface WS1, and the fourth side surface WS2.

In the present preferred embodiment, the second external electrode 40B is provided on portions in the vicinity of the second end surface LS2, of all of the first side surface TS1, the second side surface TS2, the third side surface WS1, and the fourth side surface WS2. In other words, in the present preferred embodiment, the second external electrode 40B extends from the second end surface LS2 to a portion of the first side surface TS1, a portion of the second side surface TS2, a portion of the third side surface WS1, and a portion of the fourth side surface WS2.

As described above, in the multilayer body 10, the capacitance is generated by the first opposing portions 31A of the first internal electrode layers 31 and the second opposing portions 32A of the second internal electrode layers 32 opposing each other with the dielectric layers 20 interposed therebetween. Therefore, characteristics of the capacitor are developed between the first external electrode 40A to which the first internal electrode layers 31 are connected and the second external electrode 40B to which the second internal electrode layers 32 are connected.

The first external electrode 40A includes a first base electrode layer 50A including metal components and glass components and a first plated layer 60A provided on the first base electrode layer 50A.

The second external electrode 40B includes a second base electrode layer 50B including a metal component and a glass component, and a second plated layer 60B provided on the second base electrode layer 50B.

The first base electrode layer 50A is connected to the first internal electrode layers 31. The first base electrode layer 50A includes a first end surface-side base electrode layer 51A provided on the first end surface LS1, and a first side surface-side base electrode layer 52A provided on a portion in the vicinity of the first end surface LS1, of at least one of the four side surfaces TS1, TS2, WS1, and WS2. In other words, the first side surface-side base electrode layer 52A of the first base electrode layer 50A is provided on a portion in the vicinity of the first end surface LS1, of at least one among the first side surface TS1, the second side surface TS2, the third side surface WS1, and the fourth side surface WS2.

In the present preferred embodiment, the first side surface-side base electrode layer 52A is provided on portions in the vicinity of the first end surface LS1, of all of the first side surface TS1, the second side surface TS2, the third side surface WS1, and the fourth side surface WS2. In other words, in the present preferred embodiment, the first base electrode layer 50A extends from the first end surface LS1 to a portion of the first side surface TS1, a portion of the second side surface TS2, a portion of the third side surface WS1, and a portion of the fourth side surface WS2.

The second base electrode layer 50B is connected to the second internal electrode layers 32. The second base electrode layer 50B includes a second end surface-side base electrode layer 51B provided on the second end surface LS2, and a second side surface-side base electrode layer 52B provided on a portion in the vicinity of the second end surface LS2, of at least one of the four side surfaces TS1, TS2, WS1, and WS2. In other words, the second side surface-side base electrode layer 52B of the second base electrode layer 50B is provided on a portion in the vicinity of the second end surface LS2, of at least one among the first side surface TS1, the second side surface TS2, the third side surface WS1, and the fourth side surface WS2.

In the present preferred embodiment, the second side surface-side base electrode layer 52B is provided on portions in the vicinity of the second end surface LS2, of all of the first side surface TS1, the second side surface TS2, the third side surface WS1, and the fourth side surface WS2. In other words, in the present preferred embodiment, the second base electrode layer 50B extends from the second end surface LS2 to a portion of the first side surface TS1, a portion of the second side surface TS2, a portion of the third side surface WS1, and a portion of the fourth side surface WS2.

The thickness in the length direction of the first base electrode layer 50A located in the vicinity of the first end surface LS1 is preferably, for example, about 3 µm or more and about 160 µm or less at the middle portion in the height direction T and the width direction W of the first base electrode layer 50A.

The thickness in the length direction s of the second base electrode layer 50B located in the vicinity of the second end surface LS2 is preferably, for example, about 3 µm or more and about 160 µm or less at the middle portion of the height direction T and the width direction W of the second base electrode layer 50B.

When providing the first base electrode layer 50A to at least one of portions of the first side surface TS1 and the second side surface TS2, the thickness in the height direction of the first base electrode layer 50A provided at this portion is preferably about 3 µm or more and about 40 µm or less at the middle portion in the length direction L and the width direction W of the first base electrode layer 50A provided at this portion, for example.

When providing the first base electrode layer 50A to at least one of portions of the third side surface WS1 and the fourth side surface WS2, the thickness in the width direction of the first base electrode layer 50A provided at this portion is preferably about 3 µm or more and about 40 µm or less at the middle portion in the length direction L and the height direction T of the first base electrode layer 50A provided at this portion, for example.

When providing the second base electrode layer 50B to at least one of portions of the first side surface TS1 and the second side surface TS2, the thickness in the height direction of the second base electrode layer 50B provided at this portion is preferably about 3 µm or more and about 40 µm or less at the middle portion in the length direction L and the width direction W of the second base electrode layer 50B provided at this portion, for example.

When providing the second base electrode layer 50B to at least one of portions of the third side surface WS1 and the fourth side surface WS2, the thickness in the width direction of the second base electrode layer 50B provided at this portion is preferably about 3 µm or more and about 40 µm or less at the middle portion in the length direction L and the height direction T of the second base electrode layer 50B provided at this portion, for example.

The detailed description in relation to the first base electrode layer 50A and the second base electrode layer 50B will be provided later.

The first plated layer 60A covers the first base electrode layer 50A.

The second plated layer 60B covers the second base electrode layer 50B.

The first plated layer 60A and the second plated layer 60B may include at least one selected from, for example, Cu, Ni, Sn, Ag, Pd, Ag—Pd alloy, and Au. The first plated layer 60A and the second plated layer 60B may each include a plurality of layers. The first plated layer 60A and the second plated layer 60B preferably each include a two-layer structure including a Sn plated layer on a Ni plated layer, for example.

The first plated layer 60A covers the first base electrode layer 50A. In the present preferred embodiment, the first plated layer 60A includes, for example, a first Ni plated layer 61A, and a first Sn plated layer 62A provided on the first Ni plated layer 61A.

The second plated layer 60B covers the second base electrode layer 50B. In the present preferred embodiment, the second plated layer 60B includes, for example, a second Ni plated layer 61B, and a second Sn plated layer 62B provided on the second Ni plated layer 61B.

The Ni plated layer prevents the first base electrode layer 50A and the second base electrode layer 50B from being eroded by solder when mounting the multilayer ceramic capacitor 1. Furthermore, the Sn plated layer improves the wettability of the solder when mounting the multilayer ceramic capacitor 1. This facilitates the mounting of the multilayer ceramic capacitor 1. The thickness of each of the first Ni plated layer 61A, the first Sn plated layer 62A, the second Ni plated layer 61B, and the second Sn plated layer 62B is preferably, for example, about 2 µm or more and about 15 µm or less.

Here, the basic configurations of each layer of the first external electrode 40A and the second external electrode 40B are the same. Furthermore, the first external electrode 40A and the second external electrode 40B are plane symmetric or substantially plane symmetric with respect to the WT cross-section at the middle in the length direction L of the multilayer ceramic capacitor 1. Therefore, in a case in which it is not necessary to particularly distinguish between the first external electrode 40A and the second external electrode 40B, the first external electrode 40A and the second external electrode 40B may be collectively referred to as an external electrode. The same applies to the respective layers constituting the first external electrode 40A and the second external electrode 40B. For example, in a case in which it is not necessary to particularly distinguish between the first base electrode layer 50A and the second base electrode layer 50B, the first base electrode layer 50A and the second base electrode layer 50B may be collectively referred to as a base electrode layer. Furthermore, in a case in which it is not necessary to particularly distinguish between the first end surface-side base electrode layer 51A and the second end surface-side base electrode layer 51B, the first end surface-side base electrode layer 51A and the second end surface-side base electrode layer 51B may be collectively referred to as an end surface-side base electrode layer. Furthermore, in a case in which it is not necessary to particularly distinguish between the first side surface-side base electrode layer 52A and the second side surface-side base electrode layer 52B, the first side surface-side base electrode layer 52A and the second side surface-side base electrode layer 52B may be collectively referred to as a side surface-side base electrode layer. Furthermore, in a case in which it is not necessary to particularly distinguish between the first plated layer 60A and the second plated layer 60B, the first plated layer 60A and the second plated layer 60B may be collectively referred to as a plated layer. Furthermore, in a case in which it is not necessary to particularly distinguish between the first Ni plated layer 61A and the second Ni plated layer 61B, the first Ni plated layer 61A and the second Ni plated layer 61B may be collectively referred to as a Ni plated layer. Furthermore, in a case in which it is not necessary to particularly distinguish between the first Sn plated layer 62A and the second Sn plated layer 62B, the first Sn plated layer 62A and the second Sn plated layer 62B may be collectively referred to as a Sn plated layer.

Next, a detailed description in relation to the first base electrode layer 50A and the second base electrode layer 50B will be provided. FIG. 5A is an enlarged view of a VA portion of the multilayer ceramic capacitor 1 shown in FIG. 2, and is an enlarged cross-sectional view schematically showing a cross section of the first external electrode 40A. FIG. 5B is an enlarged view of a VB portion of the multilayer ceramic capacitor shown in FIG. 2, and is an enlarged cross-sectional view schematically showing a cross section of the second external electrode 40B.

As shown in FIG. 5A, the first base electrode layer 50A is provided on the multilayer body 10. The first plated layer 60A covers the first base electrode layer 50A. The first base electrode layer 50A includes the first end surface-side base electrode layer 51A and the first side surface-side base electrode layer 52A. The first plated layer 60A includes, for example, the first Ni plated layer 61A and the first Sn plated layer 62A.

As shown in FIG. 5B, the second base electrode layer 50B is provided on the multilayer body 10. The second plated layer 60B covers the second base electrode layer 50B. The second base electrode layer 50B includes the second end surface-side base electrode layer 51B and the second side surface-side base electrode layer 52B. The second plated layer 60B includes, for example, the second Ni plated layer 61B and the second Sn plated layer 62B.

In the present preferred embodiment, the base electrode layers are each a fired layer. The base electrode layer includes a metal component M and a glass component G. The metal component M included in the base electrode layer includes at least one selected from, for example, Cu, Ni, Ag, Pd, Ag—Pd alloy, and Au. Among these, the metal component M included in the base electrode layer is preferably Cu, for example. As a result, ease of handling during processing is improved. In addition, cost reduction can be achieved.

The glass component G included in the base electrode layer may include, for example, an oxide including at least one element selected from B, Si, Ba, Mg, Al, Li, and the like. For example, it is preferable that the glass component G included in the base electrode layer is a glass including oxides such as silicic acid ($SiO_2$), alumina ($Al_2O_3$), titanium oxide ($TiO_2$), barium oxide ($BaO_2$), and zirconia ($ZrO_2$). Among them, it is more preferable that the glass component G included in the base electrode layer includes an oxide including Ba and Ti, for example For example, it is preferable that the glass component G included in the base electrode layer is a glass including barium oxide ($BaO_2$) and titanium oxide ($TiO_2$). In addition, when the glass component included in the base electrode layer is, for example, barium oxide ($BaO_2$) or titanium oxide ($TiO_2$), such a glass component has less impurities in the glass component and is soft. Therefore, since such a glass component has good processability, it is easy to process the glass to a desired size.

As shown in FIG. 5A, the first side surface-side base electrode layer 52A includes a metal component M and a glass component G. Furthermore, for example in a first range R1 spanning from a tip P1 in the vicinity of the second end surface LS2 of the first side surface-side base electrode layer 52A to a position P2 of a length L2 which is, for example 10% of a length L1 of the first side surface-side base electrode layer 52A, the proportion of the glass component G present in the first side surface-side base electrode layer 52A is about 60% or more.

As shown in FIG. 5B, the second side surface-side base electrode layer 52B includes a metal component M and a glass component G. Furthermore, for example, in a second range R2 spanning from a tip P3 in the vicinity of the first end surface LS1 of the second side surface-side base electrode layer 52B to a position P4 of a length L2 which is 10% of a length L1 of the second side surface-side base electrode layer 52B, the proportion of the glass component G present in the second side surface-side base electrode layer 52B is about 60% or more.

Furthermore, for example, it is preferable that the first side surface-side base electrode layer 52A includes the glass component G having a length which is about 60% or more of the thickness of the first side surface-side base electrode layer 52A in at least one or more locations in the first range R1.

It is preferable that the second side surface-side base electrode layer 52B includes, for example, the glass component G having a length which is about 60% or more of the thickness of the second side surface-side base electrode layer 52B in at least one or more locations in the second range R2.

In addition, the above-described configuration of the metal component M and the glass component G present in the first side surface-side base electrode layer 52A is provided on the first side surface TS1. However, this is not limiting, and is provided on any of the side surfaces TS1, TS2, WS1, and WS2 on which the first side surface-side base electrode layer 52A is provided. In addition, it is preferable that the first side surface-side base electrode layer 52A having the above-described configuration is provided on all of the side surfaces on which the first side surface-side base electrode layer 52A is provided.

Furthermore, the above-described configuration of the metal component M and the glass component G present in the second side surface-side base electrode layer 52B is provided on the first side surface TS1. However, this is not limiting, and is provided on any of the side surfaces TS1, TS2, WS1, and WS2 on which the second side surface-side base electrode layer 52B is provided. In addition, it is preferable that the second side surface-side base electrode layer 52B having the above-described configuration is provided on all of the side surfaces on which the second side surface-side base electrode layer 52B is provided.

Figure 6C:
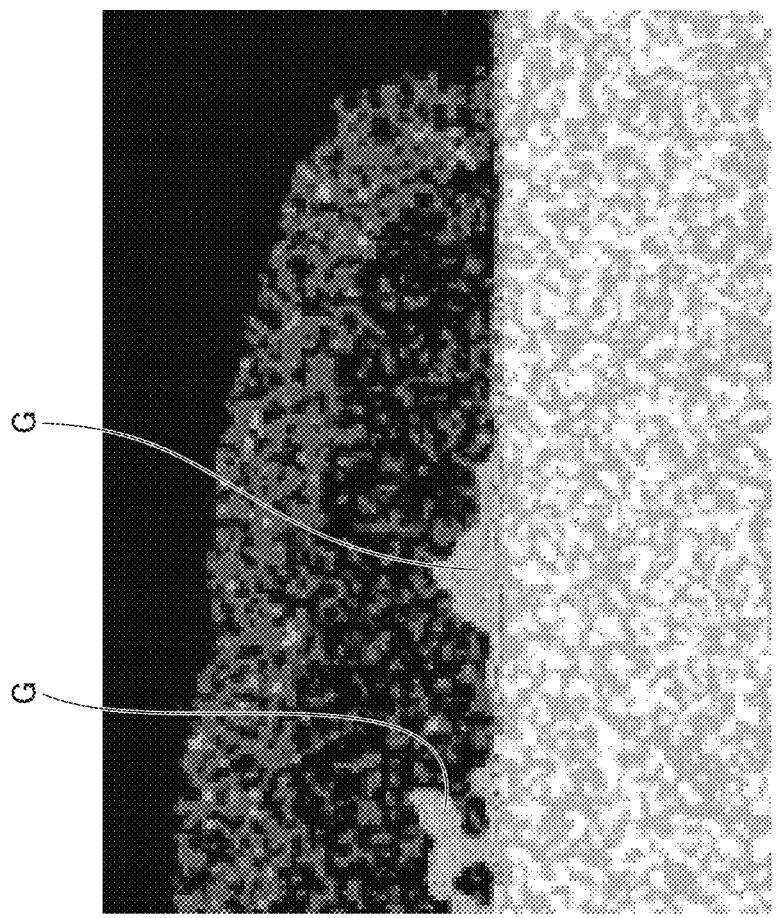
FIG. 6C is an element mapping image of Ba by EDX of a cross section of an external electrode according to the first preferred embodiment of the present invention.

Next, the states of the metal component M and the glass component G present in the side surface-side base electrode layer will be described using, as examples, microscope images showing the first range R1 of the first side surface-side base electrode layer 52A. FIG. 6A is an example of a microscopic image of a cross section of an external electrode including a side surface-side base electrode layer, and is a microscopic image of a cross section of the first external electrode 40A by a scanning electron microscope (SEM). FIG. 6B is an example of an element mapping image of a cross section of an external electrode including a side surface-side base electrode layer, and is an element mapping image of Ti of a cross section of the first external electrode 40A by energy-dispersive X-ray spectroscopy (EDX). FIG. 6C is an example of an element mapping image of a cross section of an external electrode including a side surface-side base electrode layer, and is an element mapping image of Ba of a cross section of the first external electrode 40A by EDX.

As shown in FIG. 6A, the first side surface-side base electrode layer 52A is provided on the first side surface TS1 of the multilayer body 10. Furthermore, the first Ni plated layer 61A covers the first side surface-side base electrode layer 52A. Moreover, the first Sn plated layer 62A covers the first Ni plated layer 61A. FIG. 6A shows the first range R1 described above.

The first side surface-side base electrode layer 52A includes a metal component M and a glass component G. In the first range R1, the proportion of the glass component G present in the first side surface-side base electrode layer 52A is about 60% or more. Furthermore, the first side surface-side base electrode layer 52A includes a glass component G having a length T2 which is about 60% or more of the thickness T1 of the first side surface-side base electrode layer 52A in the first range R1.

FIG. 6B is an analytical image corresponding to the SEM image of FIG. 6A, and is an element mapping image of Ti by EDX. FIG. 6C is an analytical image corresponding to the SEM image of FIG. 6A, and is an element mapping image of Ba by EDX.

As shown in FIG. 6B, Ti is detected in the portion corresponding to the glass component G present in the SEM image of FIG. 6A. Furthermore, as shown in FIG. 6C, Ba is detected in the portion corresponding to the glass component G present in the SEM image of FIG. 6A. Thus, by using EDX, the boundary between the metal component M and the glass component G present in the base electrode layer can be determined.

As described above, in the first range R1 of the first side surface-side base electrode layer 52A, the proportion of the glass component G present in the first side surface-side base electrode layer 52A is about 60% or more. In addition, in the second range R2 of the second side surface-side base electrode layer 52B as well, the proportion of the glass component G present in the second side surface-side base electrode layer 52B is about 60% or more.

Furthermore, it is preferable that the first side surface-side base electrode layer 52A includes a glass component G having a length which is about 60% or more of the thickness of the first side surface-side base electrode layer 52A in at least one or more locations in the first range R1. For example, in FIG. 6A, the height T2 of the glass component G from the surface of the multilayer body 10, that is, the length T2 of the glass component G present in the thickness direction of the first side surface-side base electrode layer 52A, is equal to or more than about 60% of the thickness dimension T1 of the first side surface-side base electrode layer 52A. In addition, in the second range R2 of the second side surface-side base electrode layer 52B as well, it is preferable that the second side surface-side base electrode layer 52B includes the glass component G having a length which is about 60% or more of the thickness of the second side surface-side base electrode layer 52B in at least one location.

Here, in the multilayer ceramic capacitor as disclosed in Japanese Unexamined Patent Application Publication No. H08-306580, stress may be applied to a multilayer body in the vicinity of the tip portion of the external electrode due to thermal expansion, impact or the like. In this case, a crack may occur in the multilayer body, starting from the vicinity of the tip portion of the external electrode.

For example, when a conventional multilayer ceramic capacitor is directly solder-mounted on a mounting board, the mounting board and the multilayer body expand or shrink based on the respective thermal expansion coefficients, in accordance with the temperature change. At this time, due to the difference in the thermal expansion coefficients between them, stress is applied to the multilayer body, such that there is a possibility that cracks occur in the multilayer body. Furthermore, when the multilayer ceramic capacitor as described in Japanese Unexamined Patent Application Publication No. H08-306580 is used in a mobile device such as a mobile phone and a portable music player, for example, the impact (stress) when the mobile device is dropped may cause cracks in the multilayer body. In addition, the influence of the tightening stress of the external electrode with respect to the multilayer body may cause cracks. In this case, a crack is likely to occur in the multilayer body, starting from the vicinity of the tip portion of the external electrode.

Heretofore, it has been disclosed that the glass component in the base electrode layer corrodes the ceramics of the multilayer body, thus causing the strength of the multilayer body to decrease. However, as a result of intensive studies, it has been discovered that cracks occurring in the multilayer body can be reduced or prevented by controlling the proportion of glass components present in the base electrode layer and the like.

More specifically, by establishing the structure of the base electrode layer in accordance with the structure of the present preferred embodiment, it is possible to guide the stress to the glass component of the tip of the external electrode when the stress is applied to the mounting board or the multilayer body, and it is further possible to keep the cracks within the glass component of the tip of the base electrode layer. As a result, since the stress is less likely to be applied to the multilayer body, it is possible to reduce or prevent cracks generated in the multilayer body.

In addition, the reason that the range of the side surface-side base electrode layer in which the proportion of the glass component G is about 60% or more is set to the first range R1 and the second range R2 described above is that the location where cracks occur is concentrated at the tip portion of the external electrode. By controlling the proportion of the glass component G present in the first range R1 and the second range R2, it is possible to control the cracking that may cause problems.

In addition, in the first range R1 and the second range R2, when the proportion of the glass component G present in the side surface-side base electrode layer is smaller than about 60%, there is a possibility that the mechanical load cannot be released only with the glass component G. In this case, since the load is applied to the multilayer body 10, cracks may occur in the multilayer body 10.

In addition, in the first range R1 and the second range R2, since the length T2 of the glass component G present in the thickness direction of the side surface-side base electrode layer is about 60% or more of the thickness dimension T1 of the side surface-side base electrode layer, the mechanical load is easily released by the presence of the glass component G. As a result, since the stress is less likely to be applied to the multilayer body 10, it is possible to reduce or prevent cracks generated in the multilayer body 10.

In addition, as shown in FIG. 5A, the first end surface-side base electrode layer 51A provided on the first end surface LS1 also includes a metal component M and a glass component G. Furthermore, the proportion of the glass component G present in the first end surface-side base electrode layer 51A is preferably about 10% or more and about 40% or less, for example. In addition, in the present preferred embodiment, the proportion of the glass component G present in the first end surface-side base electrode layer 51A is smaller than the proportion of the glass component G present in the first range R1 of the first side surface-side base electrode layer 52A.

In addition, as shown in FIG. 5B, the second end surface-side base electrode layer 51B provided on the second end surface LS2 also includes a metal component M and a glass component G. Furthermore, the proportion of the glass component G present in the second end surface-side base electrode layer 51B is preferably, for example, about 10% or more and about 40% or less. In addition, in the present preferred embodiment, the proportion of the glass component G present in the second end surface-side base electrode layer 51B is smaller than the proportion of the glass component G present in the second range R2 of the second side surface-side base electrode layer 52B.

The glass component G defines and functions as a filler and sintering aid for the base electrode layer. Therefore, with the above-described configuration, the densification of the end surface-side base electrode layer is improved, and moisture resistance reliability is improved. Furthermore, since the proportion of the glass component G, which defines and functions as an insulator, is about 40% or less, the increase in resistance value of the junction between the internal electrode layers and the end surface-side base electrode layer is reduced or prevented. Therefore, it is possible to reduce or prevent the occurrence of problems such as failure in obtaining a capacitance and heat generation. That is, by providing the configuration of the present preferred embodiment, the connection reliability is improved.

When the proportion of the glass component G present in the end surface-side base electrode layer is less than about 10%, the bonding force between the multilayer body 10 and the end surface-side base electrode layer may be reduced. In this case, the sealability at the interface between the multilayer body 10 and the end surface-side base electrode layer is lowered, such that the humidity resistance may be lowered.

When the proportion of the glass component G present in the end surface-side base electrode layer is greater than about 40%, due to the glass component G, which is an insulator, the resistance value of the junction between the internal electrode layers and the end surface-side base electrode layer may increase. Therefore, from the viewpoint of capacitance and heat generation, it is preferable that the proportion of the glass component G present in the end surface-side base electrode layer be about 40% or less.

In the present preferred embodiment, the proportion of the glass component G present in the region closer to the first end surface LS1 than the first range R1, i.e., the proportion of the glass component G present in the first side surface-side base electrode layer 52A in the region from the position P2 to the first end surface LS1 may be, for example, about 10% or more and about 40% or less, which is the same as or similar to the proportion of the glass component G present in the first end surface-side base electrode layer 51A.

Furthermore, in the present preferred embodiment, the proportion of the glass component G present in the region closer to the second end surface LS2 than the second range R2, i.e., the proportion of the glass component G present in the second side surface-side base electrode layer 52B in the region from the position P4 to the second end surface LS2, may be, for example, about 10% or more and about 40% or less, which is the same as or similar to the proportion of the glass component G present in the second end surface-side base electrode layer 51B.

When the dimension in the length direction of the multilayer ceramic capacitor 1 including the multilayer body 10 and the external electrode 40 is defined as the L dimension, the L dimension is preferably, for example, about 0.6 mm or more and about 2.0 mm or less. Furthermore, when the dimension in the height direction of the multilayer ceramic capacitor 1 is defined as the T dimension, the T dimension is preferably, for example, about 0.3 mm or more and about 1.2 mm or less. When the dimension in the width direction of the multilayer ceramic capacitor 1 is defined as the W dimension, the W dimension is preferably, for example, about 0.3 mm or more and about 1.2 mm or less.

Here, a non-limiting example of a method of measuring the proportion A of the glass component G will be described. The proportion A of the glass component G refers to a ratio occupied by the glass component G present in the base electrode layer.

Here, as a measurement example of the proportion A of the glass component G, a non-limiting example of a method of measuring the proportion A of the glass component in the first side surface-side base electrode layer 52A in the first range R1 will be described.

First, in order to observe the cross section of the first side surface-side base electrode layer 52A, the multilayer ceramic capacitor 1 is subjected to polishing from any of the first side surface TS1, the second side surface TS2, the third side surface WS1, and the fourth side surface WS2. For example, when the first side surface-side base electrode layer 52A is provided on the first side surface TS1 or the second side surface TS2, polishing is performed from the third side surface WS1 or the fourth side surface WS2. Then, polishing is performed up to a position which is about half of the W dimension so that the third side surface WS1 or a cross section parallel to or substantially parallel to the fourth side surface WS2 is exposed, such that the LT cross section is exposed. Thereafter, the first side surface-side base electrode layer 52A in the LT cross-section is observed by SEM. The observation magnification at this time is set as a magnification in which the first range R1 falls. Next, in the observation area by the observation magnification, element mapping by EDX is performed. Thus, a portion where each of the metal component M and the glass component G, which is a main component of the first base electrode layer 50A, is present is clarified. That is, the border between the metal component M and the glass component G present in the first base electrode layer 50A can be determined, and the metal component M and the glass component G are distinguished from each other.

Thereafter, the proportion A of the glass component G present in the first side surface-side base electrode layer 52A is calculated by the following Expression (1) using the first range R1 as the measurement target region.

Proportion $A$(%) of the glass component $G$ present= ((the area of the portion of the glass component $G$)/((the area of the portion of the glass component $G$)+(the area of the portion of the metal component $M$))×100       Expression (1)

Furthermore, the dimensional ratio B of the length T2 of the glass component G to the thickness T1 of the first side surface-side base electrode layer 52A is calculated by the following Expression (2). This dimensional ratio B is calculated by the length T2 of the portion of the glass component G in the thickness direction of the first side surface-side base electrode layer 52A, and the thickness T1 of the first side surface-side base electrode layer 52A at the same position as the position where the length T2 is measured, in the length direction L.

Dimensional ratio $B$(%)=((length $T2$ of portion of glass component $G$)/(thickness $T1$ of side surface-side base electrode layer)×100       Expression (2)

The glass component G included in the base electrode layer is illustrated based on the result of the element mapping by EDX. Therefore, the length T2 of the portion of the glass component G present in the Expression (2) can be physically measured based on the illustrated result. Furthermore, the thickness T1 of the side surface-side base electrode layer in expression (2) can be physically measured based on the element mapping result of the metal component, which is a main component of the base electrode layer from EDX.

In addition, when the second range R2 of the second side surface-side base electrode layer 52B is used as the measurement target region, the proportion A and the dimensional ratio B are measured in the same or similar manner.

In addition, even when the other portion, for example, the first end surface-side base electrode layer 51A and the second end surface-side base electrode layer 51B, are used as the measurement target region, the proportion A of the glass component G is measured by the same method. In addition, when the measurement target region is large, the measurement is performed at the same observation magnification as the observation magnification when the first range R1 is observed as the measurement target.

Next, a non-limiting example of a method of manufacturing the multilayer ceramic capacitor 1 of the present preferred embodiment will be described.

A dielectric sheet for the dielectric layer 20 and a conductive paste for the internal electrode layer 30 are provided.

The conductive paste for the dielectric sheet and the internal electrode includes a binder and a solvent. Known binders and solvents may be used.

On the dielectric sheet, a conductive paste for the internal electrode layer 30 is printed in a predetermined pattern by, for example, screen printing or gravure printing. Thus, the dielectric sheet in which the pattern of the first internal electrode layer 31 is formed, and the dielectric sheet in which the pattern of the second internal electrode layer 32 is formed is prepared.

By a predetermined number of dielectric sheets in which the pattern of the internal electrode layer is not printed being laminated, a portion defining and functioning as the first side surface-side outer layer portion 12 in the vicinity of the first side surface TS1 is formed. On top of that, the dielectric sheets in which the pattern of the first internal electrode layer 31 is printed, and the dielectric sheets in which the pattern of the second internal electrode layer 32 is printed are sequentially laminated, such that a portion defining and functioning as the inner layer portion 11 is formed. On this portion defining and functioning as the inner layer portion 11, a predetermined number of dielectric sheets in which the pattern of the internal electrode layer is not printed are laminated, such that a portion defining and functioning as the second side surface-side outer layer portion 13 in the vicinity of the second side surface TS2 is formed. Thus, a laminated sheet is produced.

The laminated sheet is pressed in the height direction by hydrostatic pressing, for example, such that a laminated block is produced.

The laminated block is cut to a predetermined size, such that laminate chips are cut out. At this time, corners and ridges of the laminate chip may be rounded by barrel polishing or the like.

The laminate chip is fired to produce the multilayer body 10. The firing temperature depends on the materials of the dielectric layers 20 and the internal electrode layers 30, but is preferably about 900° C. or more and about 1400° C. or less, for example.

The conductive paste defining and functioning as the base electrode layer is applied to both end surfaces of the multilayer body 10. In the present preferred embodiment, the base electrode layer is a fired layer. A conductive paste including a glass component and a metal component is applied to the multilayer body 10. At this time, the state of the glass can be controlled by controlling the coating method, the coating thickness, and the content of glass in the conductive paste.

First, in the present preferred embodiment, a conductive paste can be applied by, for example, a dipping method to a portion that defines and functions as the first end surface-side base electrode layer 51A and a portion that defines and functions as the first side surface-side base electrode layer 52A excluding the first range R1. In addition, a conductive paste can also be applied by the dipping method to a portion that defines and functions as the second end surface-side base electrode layer 51B and a portion that defines and functions as the second side surface-side base electrode layer 52B excluding the second range R2.

Thereafter, a conductive paste can be applied by, for example, a printing method or a roller method to a portion that defines and functions as the first range R1 of the first side surface-side base electrode layer 52A and a portion that functions as the second range R2 of the second side surface-side base electrode layer 52B.

Alternatively, a conductive paste having a different ratio of glass components can also be applied by applying two coats while performing masking respectively on the portion excluding the first range R1 and the portion functioning as the first range R1 among the portion functioning as the first side surface-side base electrode layer 52A. In addition, a conductive paste having a different ratio of glass components can also be applied by applying two coats while performing masking respectively on the portion functioning as the second range R2, and the portion excluding the second range R2 among the portion defining and functioning as the second side surface-side base electrode layer 52B.

In addition, the composition of the conductive paste to be applied to the portion which defines and functions as the base electrode layer located in the first range R1 and the second range R2 preferably has the ratio of the glass frit of, for example, about 27 vol % or more and about 45 vol % or less. On the other hand, the composition of the conductive paste to be applied to the portion which defines and functions as the first end surface-side base electrode layer 51A and the portion which defines and functions as the second end surface-side base electrode layer 51B preferably has the ratio of the glass frit of, for example, about 3 vol % or more and about 27 vol % or less. In addition, the composition of the conductive paste to be applied to the portion that defines and functions as the first side surface-side base electrode layer 52A excluding the first range R1, and the portion of the second side surface-side base electrode layer 52B excluding the second range R2 preferably has the ratio of the glass frit, for example, of about 3 vol % or more and about 27 vol % or less.

Thereafter, a firing process is performed to form the base electrode layer. The temperature of the firing process at this time is preferably, for example, about 700° C. or higher and about 900° C. or lower.

Thereafter, a plated layer is formed on the surface of the base electrode layer. In the present preferred embodiment, the first plated layer 60A is formed on the surface of the first base electrode layer 50A. Furthermore, the second plated layer 60B is formed on the surface of the second base electrode layer 50B. In the present preferred embodiment, the Ni plated layer and the Sn plated layer are formed as the plated layers. Upon performing the plating process, electrolytic plating or electroless plating, for example, may be adopted. However, the electroless plating has a disadvantage in that a pretreatment with a catalyst or the like is necessary in order to improve the plating deposition rate, and thus the process becomes complicated. Therefore, normally, electrolytic plating is preferably adopted. The Ni plated layer and the Sn plated layer are sequentially formed by barrel plating, for example.

With such a manufacturing process, the multilayer ceramic capacitor 1 is manufactured.

According to the multilayer ceramic capacitor 1 of the present preferred embodiment, the following advantageous effects are achieved.

(1) The multilayer ceramic capacitor 1 according to the present preferred embodiment includes the multilayer body 10 including the plurality of laminated dielectric layers 20, the multilayer body 10 further including the first side surface TS1 and the second side surface TS2 opposing each other in the height direction, the third side surface WS1 and the fourth side surface WS2 opposing each other in the width direction perpendicular or substantially perpendicular to the height direction, and the first end surface LS1 and the second end surface LS2 opposing each other in the length direction perpendicular or substantially perpendicular to the height direction and the width direction, the first internal electrode layers 31 on the plurality of dielectric layers 20 and exposed at the first end surface LS1, the second internal electrode layers 32 on the plurality of dielectric layers 20 and exposed at the second end surface LS2, the first external electrode 40A connected to the first internal electrode layers 31 and provided in a vicinity of the first end surface LS1, and the second external electrode 40B connected to the second internal electrode layers 32 and provided in a vicinity of the second end surface LS2, in which the first external electrode 40A includes the first base electrode layer 50A including the metal component M and the glass component G, and the first plated layer 60A on the first base electrode layer 50A, the second external electrode 40B includes the second base electrode layer 50B including the metal component M and the glass component G, and the second plated layer 60B on the second base electrode layer 50B, the first base electrode layer 50A includes the first end surface-side base electrode layer 51A provided on the first end surface LS1, and the first side surface-side base electrode layer 51B on a portion in a vicinity of the first end surface LS1, of at least one of the first to fourth side surfaces TS1, TS2, WS1, and WS2, the second base electrode layer 50B includes the second end surface-side base electrode layer 51B provided on the second end surface LS2, and the second side surface-side base electrode layer 52B on a portion in a vicinity of the second end surface LS2, of at least one of the first to fourth side surfaces TS1, TS2, WS1, and WS2, a proportion of the glass component G in the first side surface-side base electrode layer 52A is about 60% or more in the first range R1 from a tip P1 in a vicinity of the second end surface LS2, of the first side surface-side base electrode layer 52A to a position P2 of a length L2 which is about 10% of a dimension L1 in the length direction of the first side surface-side base electrode layer 52A, and a proportion of the glass component G in the second side surface-side base electrode layer 52A is about 60% or more in the second range R2 from a tip P3 in a vicinity of the first end surface LS1, of the second side surface-side base electrode layer 52B to a position P4 of a length L2 which is 10% of a dimension L1 in the length direction of the second side surface-side base electrode layer 52B. This makes it possible to reduce or prevent the occurrence of cracks in the multilayer body 10.

(2) The first side surface-side base electrode layer 52A according to the present preferred embodiment includes a glass component G having a length T2 which is about 60% or more of a thickness T1 of the first side surface-side base electrode layer 52A in at least one or more locations in the first range R1, and the second side surface-side base electrode layer 52B includes a glass component G having a length T2 which is about 60% or more of a thickness T1 of the second side surface-side base electrode layer 52B in at least one or more locations in the second range R2. This makes it possible to reduce or prevent the occurrence of cracks in the multilayer body 10.

(3) The metal component M of the first base electrode layer 50A and the second base electrode layer 50B according to the present preferred embodiment is Cu. This improves the ease of handling during processing. In addition, cost reduction can be achieved.

(4) The glass component G of the first base electrode layer 50A and the second base electrode layer 50B according to the present preferred embodiment includes at least either one of Ba or Ti. Such a glass component has less impurities in the glass component and is soft. Therefore, since such a glass component has good processability, it is easy to process the glass to a desired size.

(5) A proportion of the glass component G in the first end surface-side base electrode layer 51A according to the present preferred embodiment is about 10% or more and about 40% or less, and a proportion of the glass component G in the second end surface-side base electrode layer 51B is about 10% or more and about 40% or less. With such a configuration, the densification of the first end surface-side base electrode layer 51A and the second end surface-side base electrode layer 51B is improved, and moisture resistance reliability is improved. Furthermore, since the proportion of the glass component G, which defines and functions as an insulator, is about 40% or less, the increase in resistance value of the junction between the internal electrode layers 30 and the end surface-side base electrode layer is reduced or prevented. Therefore, it is possible to reduce or prevent the occurrence of problems such as failure in obtaining a capacitance and heat generation. That is, the connection reliability is improved.

Second Preferred Embodiment

Hereinafter, a multilayer ceramic capacitor 1 according to a second preferred embodiment of the present invention will be described. It should be noted that, in the following, the same components as those of the first preferred embodiment are denoted by the same reference numerals, and detailed descriptions thereof are omitted. FIG. 7 is an enlarged sectional view schematically showing a cross section of an external electrode of the multilayer ceramic capacitor of the present preferred embodiment, and corresponding to FIG. 5A.

The multilayer ceramic capacitor 1 of the present preferred embodiment differs from the first preferred embodiment in the aspect of the side surface-side base electrode layer. As described in the first preferred embodiment, the basic configuration of each layer constituting the first external electrode 40A and the second external electrode 40B is the same or substantially the same. Therefore, in the present preferred embodiment, the first side surface-side base electrode layer 52A is used as an example of the side base electrode layer.

As shown in FIG. 7, the first side surface-side base electrode layer 52A is provided on the first side surface TS1 of the multilayer body 10. Furthermore, the first Ni plated layer 61A covers the first side surface-side base electrode layer 52A. Furthermore, the first Sn plated layer 62A covers the first Ni plated layer 61A. The first side surface-side base electrode layer 52A includes a metal component M and a glass component G.

In the present preferred embodiment, the proportion of the glass component G present in the first side surface-side base electrode layer 52A is, for example, about 60% or more in the entire or substantially the entire region of the first side surface-side base electrode layer 52A. That is, as shown in FIG. 7, the proportion of the glass component G present in the first side surface-side base electrode layer 52A has become about 60% or more, in the entire or substantially the entire region from the tip P1 of the first side surface-side base electrode layer 52A in the vicinity of the second end surface LS2 up to the first end surface LS1, as shown by the length L1 in the length direction. In other words, in the present preferred embodiment, the proportion of the glass component G present in the region which is closer to the first end surface LS1 than the first range R1 (refer to FIG. 5A) of the first side surface-side base electrode layer 52A is, for example, about 60% or more, which is similar to the proportion of the glass component in the first range R1.

In the present preferred embodiment, although not illustrated, the proportion of the glass component G present in the second side surface-side base electrode layer 52B is, for example, about 60% or more in the entire or substantially the entire region of the second side surface-side base electrode layer 52B. That is, the proportion of the glass component G present in the second side surface-side base electrode layer 52B is, for example, about 60% or more in the entire or substantially the entire region from the tip of the second side surface-side base electrode layer 52B in the vicinity of the first end surface LS1 up to the second end surface LS2. In other words, in the present preferred embodiment, the proportion of the glass component G present in the region closer to the second end surface LS2 than the second range R2 (refer to FIG. 5B) of the second side surface-side base electrode layer 52B is, for example, about 60% or more, which is similar to the proportion of the glass component in the second range R2.

Next, a non-limiting example of a method of manufacturing the multilayer ceramic capacitor 1 of the present preferred embodiment will be described. Here, only the process differing from the first preferred embodiment, that is, a process of applying a conductive paste defining and functioning as a base electrode layer, will be described.

The conductive paste defining and functioning as the base electrode layer is applied to both end surfaces of the multilayer body 10. In the present preferred embodiment, the base electrode layers are each a fired layer. A conductive paste including a glass component and a metal component is applied to the multilayer body 10. At this time, the state of the glass can be controlled by controlling the coating method, the coating thickness, and the content of glass in the conductive paste.

At this time, it is preferable to vary between the composition of the conductive paste to be applied to a portion defining and functioning as the first side surface-side base electrode layer 52A and a portion defining and functioning as the second side surface-side base electrode layer 52B, and the composition of the conductive paste to be applied to a portion defining and functioning as the first end surface-side base electrode layer 51A and a portion defining and functioning as the second end surface-side base electrode layer 51B.

For example, it is preferable that the composition of the conductive paste to be applied to the portion defining and functioning as the first side surface-side base electrode layer 52A and the portion defining and functioning as the second side surface-side base electrode layer 52B have a ratio of the glass frit of, for example, about 27 vol % or more and about 45 vol % or less. On the other hand, it is preferable that the composition of the conductive paste to be applied to the portion defining and functioning as the first end surface-side base electrode layer 51A and the portion defining and functioning as the second end surface-side base electrode layer 51B have a ratio of the glass frit of, for example, about 3 vol % or more and about 27 vol % or less.

In addition, it is preferable that the conductive paste be applied to the portion defining and functioning as the first side surface-side base electrode layer 52A and the portion defining and functioning as the second side surface-side base electrode layer 52B by, for example, a printing method or a roller method. In addition, it is preferable that the conductive paste be applied to the portion defining and functioning as the first end surface-side base electrode layer 51A and the portion defining and functioning as the second end surface-side base electrode layer 51B by, for example, a dipping or roller method.

Thereafter, a firing process is performed to form the base electrode layers. The temperature of the firing process at this time is preferably, for example, about 700° C. or higher and about 900° C. or lower.

The configuration of the multilayer ceramic capacitor 1 is not limited to the configuration shown in FIGS. 1 to 4. For example, the multilayer ceramic capacitor 1 may include a two-portion structure, a three-portion structure, or a four-portion structure as shown in FIGS. 8A to 8C.

Figure 8A:
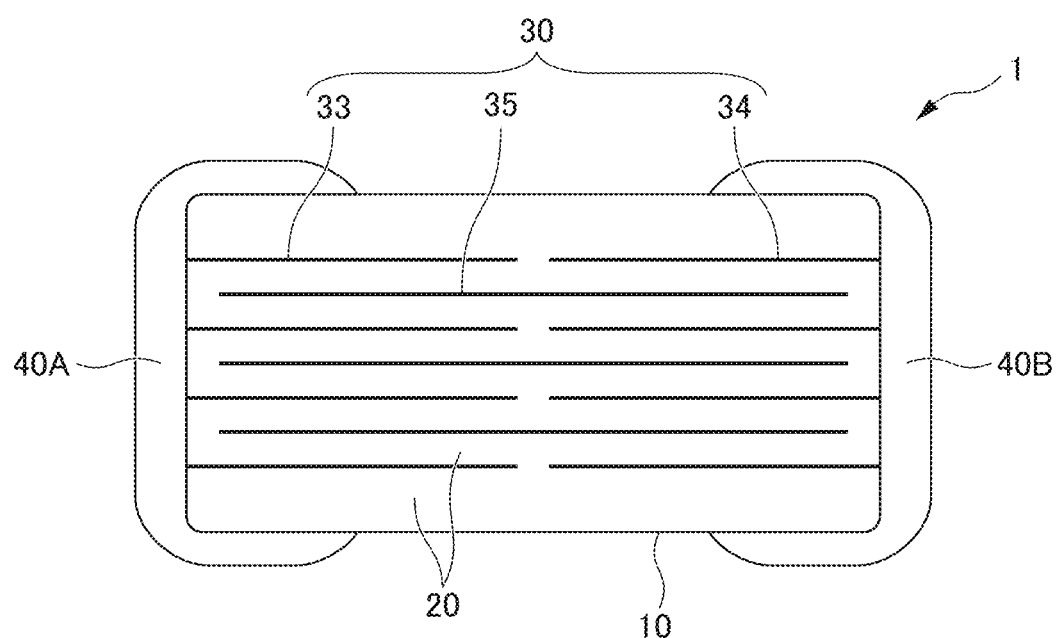
FIG. 8A is a diagram showing a multilayer ceramic capacitor including a two-portion structure.
Figure 8B:
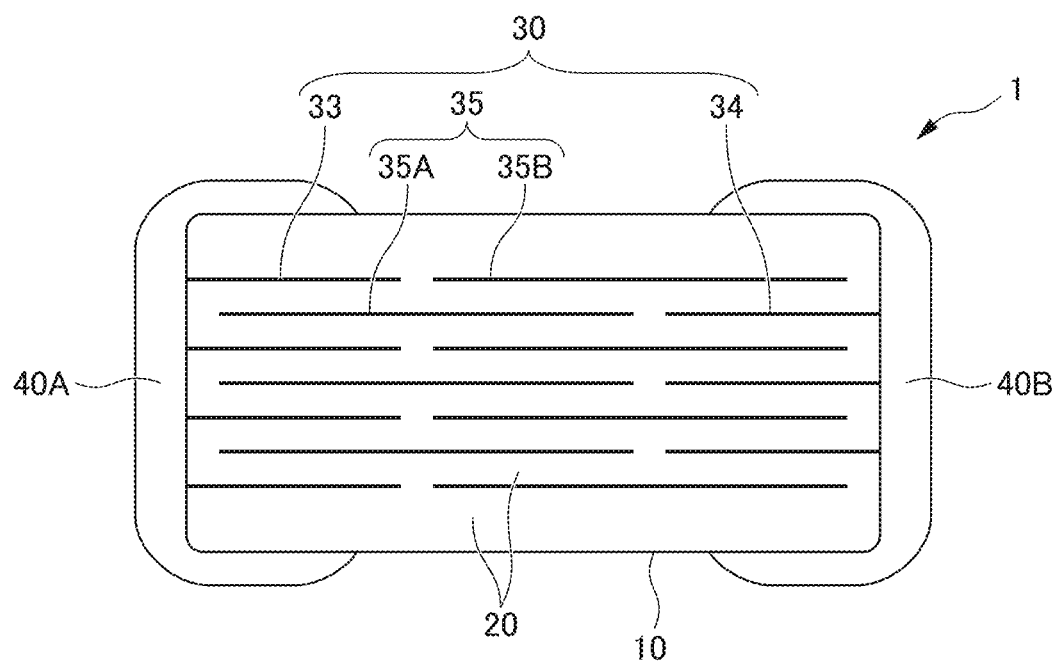
FIG. 8B is a diagram showing a multilayer ceramic capacitor including a three-portion structure.
Figure 8C:
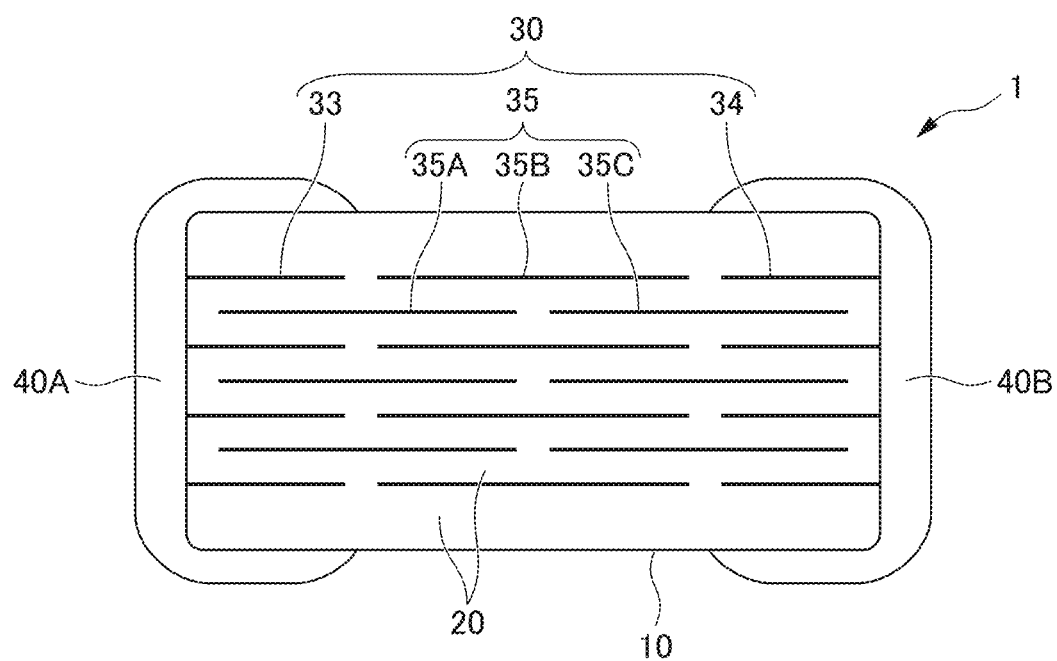
FIG. 8C is a diagram showing a multilayer ceramic capacitor including a four-portion structure.

The multilayer ceramic capacitor 1 shown in FIG. 8A is a multilayer ceramic capacitor 1 including a two-portion structure. The multilayer ceramic capacitor 1 includes, as the internal electrode layer 30, a floating internal electrode layer 35 does not extend to either side of the first end surface LS1 and the second end surface LS2, in addition to the first internal electrode layer 33 and the second internal electrode layer 34. The multilayer ceramic capacitor 1 shown in FIG. 8B includes a three-portion structure including, as the floating internal electrode layer 35, a first floating internal electrode layer 35A and a second floating internal electrode layer 35B. The multilayer ceramic capacitor 1 shown in FIG. 8C includes a four-portion structure including, as the floating internal electrode layer 35, the first floating internal electrode layer 35A, the second floating internal electrode layer 35B and a third floating internal electrode layer 35C. Thus, by providing the floating internal electrode layer 35 as the internal electrode layer 30, the multilayer ceramic capacitor 1 includes a structure in which the counter electrode portion is divided into a plurality of counter electrode portions. With such a configuration, a plurality of capacitor components are provided between the opposing internal electrode layers 30, such that a configuration in which these capacitor components are connected in series is provided. Therefore, the voltage applied to the respective capacitor components becomes low, and thus, it is possible to achieve a high breakdown voltage of the multilayer ceramic capacitor 1. The multilayer ceramic capacitor 1 of the present preferred embodiment may be a multiple-portion structure of four or more parts.

Experimental Example

A multilayer ceramic capacitor was manufactured as a sample of the experimental example, and a crack test, a reliability test, and a connectivity test were performed.

First, as a sample of the experimental example, a multilayer ceramic capacitor having the following specifications was manufactured according to the manufacturing method of the first preferred embodiment.

Dimensions of multilayer ceramic capacitor: L×W×T=about 1.00 mm×about 0.60 mm×about 0.50 mm Dielectric layer: $BaTiO_3$ Capacitance: about 4.7 μF Rated voltage: about 4 V Internal electrode layer: Ni Base electrode layer Electrode Including a Metal Component and a Glass Component Metal component: Cu Glass component: glass including Ba and Ti Thickness of the end surface-side base layer (central portion of end surface): about 30 μm Thickness of the side surface-side base layer (central portion in the length direction): about 15 μm Proportion a of Glass Component: Refer to Test 1 and Test 2

Plated layer: 2-layer structure of Ni plated layer of about 4 μm and Sn plated layer of about 4 μm Next, the prepared samples were tested according to the following test method.

Test 1

Fifty samples were prepared for each test condition of the crack test, in which the proportion of the glass component of the end surface-side base electrode layer was set to about 20%, and the proportion A of the glass component of the side surface-side base electrode layer was varied between the first range R1 and the second range R2, and the crack tests were performed. In addition, samples were prepared by setting the proportion of the glass frit in the conductive paste in advance so that the proportion of the glass component in the end surface-side base electrode layer was about 20%. In addition, samples were prepared by setting the proportion of the glass frit in the conductive paste in advance so as to be about 20% to about 80% as described in Table 1 such that the proportion A of the glass component of the side surface-side base electrode layer in the first range R1 and the second range R2 became the proportion A of the glass described in Table 1. Furthermore, samples having the same specifications were additionally prepared, and the dimensional ratio B of the length T2 of the glass component G to the thickness T1 of the side surface-side base electrode layer was confirmed. The confirmation results of the dimensional ratio B are shown in Table 1. In addition, the test results of the crack test are shown in Table 1.

TABLE 1

| PROPORTION A OF GLASS (FIRST RANGE R1, SECOND RANGE R2) | | 20% | 40% | 50% | 55% | 60% | 70% | 80% |
|---|---|---|---|---|---|---|---|---|
| GLASS DIMENSIONAL RATIO B | | 20% OR MORE | 40% OR MORE | 50% OR MORE | 55% OR MORE | 60% OR MORE | 70% OR MORE | 80% OR MORE |
| NUMBER OF FAILURE SAMPLES IN CRACK TEST (DEFLECTION AMOUNT) | 3.0 mm | 11/50 | 5/50 | 2/50 | 1/50 | 0/50 | 0/50 | 0/50 |
| | 4.0 mm | 31/50 | 16/50 | 7/50 | 3/50 | 0/50 | 0/50 | 0/50 |
| | 5.0 mm | 47/50 | 30/50 | 17/50 | 8/50 | 0/50 | 0/50 | 0/50 |

Test 2

Seventy-seven samples were prepared for the reliability test and 100 for the connectivity test, in which the proportion A of the glass component of the side surface-side base electrode layer in the first range R1 and the second range R2 was set to about 60% and the proportion A of the glass component of the end surface-side base electrode layer was varied, and the reliability test and the connectivity test were performed on the samples. In addition, samples were prepared by setting the proportion of the glass frit in the conductive paste in advance so that the proportion A of the glass component of the side surface-side base electrode layer in the first range R1 and the second range R2 was about 60%. In addition, samples were prepared by setting the proportion of the glass frit in the conductive paste in advance so as to be about 5% to about 50% as described in Table 2 such that the proportion of the glass component of the end surface-side base electrode layer became the proportion A of the glass described in Table 2. The results of the reliability test and the connectivity test are shown in Table 2. In addition, when samples having the same specifications were additionally prepared, and the dimensional ratio B of the length T2 of the glass component G to the thickness T1 of the side surface-side base electrode layer was calculated, the dimensional ratio B was about 60% or more for all the samples.

TABLE 2

| PROPORTION A OF GLASS (END SURFACE) | 5% | 10% | 20% | 40% | 45% | 50% |
|---|---|---|---|---|---|---|
| NUMBER OF FAILURE SAMPLES IN RELIABILITY TEST | 5/77 | 0/77 | 0/77 | 0/77 | 0/77 | 0/77 |
| NUMBER OF FAILURE SAMPLES IN CONNECTIVITY TEST | 0/100 | 0/100 | 0/100 | 0/100 | 2/100 | 11/100 |

The measurement method and test method in the above tests are shown below.

Method of Measuring the Glass Dimensional Ratio B of Each Sample

The glass dimensional ratio B is calculated using Expression (2) by the above-described method. The glass dimensional ratio B is represented by the largest numerical value in the first range R1 and the second range R2.

Dimensional ratio $B(\%)=((\text{Length } T2 \text{ of portion of glass component } G)/(\text{Thickness } T1 \text{ of side surface-side base electrode layer}))\times 100$  Expression (2)

In addition, by the element mapping by EDX, the positions of Ti and Ba included in the glass component and the metal component which is the main component of the base electrode layer are clarified. In the present preferred embodiment, since the glass component including Ti and Ba is used, a portion of the glass component is specified based on either one of the element mapping results, and the glass dimensional ratio B is thus calculated.

Crack Test

First, a multilayer ceramic capacitor as a sample was mounted using a solder paste on a mounting board having a thickness of about 1.6 mm. Thereafter, mechanical stress was applied on the back surface of the board of the portion where the multilayer ceramic capacitor was not mounted by bending the board by pressing a push rod having a diameter of about 1 μm. Here, the retention time of retaining the board in the bent state was about 60 seconds. In addition, the amount of deflection of the board was about 3.0 mm, about 4.0 mm, and about 5.0 mm. It should be noted that this test is more stringent than normal use conditions of the multilayer ceramic capacitor.

After bending the board, the multilayer ceramic capacitor was removed from the board, and the presence or absence of cracking was observed. More specifically, the multilayer ceramic capacitor was polished to a position which is half of the W dimension, to expose the LT cross section. Thereafter, using a microscope, the polished surface was observed at an observation magnification of 40 times or more, to confirm the presence or absence of cracking in the multilayer body 10. The samples in which cracking occurrence was confirmed were determined to be failure samples of the crack test.

Reliability Test

Each sample was mounted on a glass epoxy substrate using lead-free solder ($Sn_3Ag_{0.5}Cu$). Thereafter, each sample was put into a high-temperature, high-humidity tank at about 125° C. and about 95% RH relative humidity, and subjected to a moisture resistance acceleration test under the conditions of about 2.5 V and about 144 hours. Samples in which the insulation resistance value (IR value) was lowered by two orders of magnitude or more were determined to be failure samples of the reliability test in which the moisture resistance was deteriorated.

Connectivity Test

In the connectivity test, the evaluation was made based on whether dielectric breakdown occurred or not when a voltage of about 400% or more of the rated voltage was applied to the multilayer ceramic capacitor for about 60 seconds. In this experimental example, samples in which dielectric breakdown occurred when applying a voltage of about 600% of the rated voltage to the multilayer ceramic capacitor alone were determined as failure samples of the connectivity test. In addition, when the proportion of the glass component increases, the glass component tends to concentrate at the interface between the multilayer body and the base electrode layer. In this case, since the glass is an insulator, the connection resistance between the internal electrode layers and the base electrode layer increases. Therefore, when overload voltage is applied to the multilayer ceramic capacitor, dielectric breakdown occurs in a portion where the connection resistance is large.

As shown in Table 1, samples in which the glass-proportion A in the first range R1 of the first side surface-side base electrode layer 52A and the second range R2 of the second side surface-side base electrode layer 52B was about 60% or more exhibited favorable results in the crack test. On the other hand, some of the samples in which the glass-proportion A was about 55% or less were determined as failure samples in the crack test.

As shown in Table 2, samples in which the glass-proportion A in the first end surface-side base electrode layer 51A and the second end surface-side base electrode layer 51B was about 10% or more exhibited favorable results in the reliability test. On the other hand, some samples in which the glass-proportion A was about 5% were determined as failure samples in the reliability test.

As shown in Table 2, samples in which the glass-proportion A in the first end surface-side base electrode layer 51A and the second end surface-side base electrode layer 51B was about 40% or less exhibited favorable results in the connectivity test. On the other hand, some samples in which the glass-proportion A was about 45% or more were determined as failure samples in the reliability test.

From the above experimental results, by the presence ratio of glass in the side surface side underlayer being about 60% or more, it can be seen that it is possible to reduce or prevent the occurrence of cracks. Further, by the presence ratio of glass in the end face side underlying electrode layer being about 10% or more about and 40% or less, it can be seen that the reliability and connectivity are maintained favorable.

As described above, with the configuration of the above-described preferred embodiment, when the stress is applied to the mounting board or the multilayer body, it is possible to guide the stress to the glass component at the tip of the external electrode, and it is further possible to keep the cracks within the glass component at the tip of the base electrode layer. As a result, since the stress is less likely to be applied to the multilayer body, it is possible to reduce or prevent cracks generated in the multilayer body.

Furthermore, since the proportion of glass in the end surface-side base electrode layer is set to about 10% or more and about 40% or less, the densification of the external electrode is improved, and moisture resistance reliability is improved. Furthermore, the increase in the resistance value of the junction between the internal electrode layers and the end surface side base electrode layer is reduced or prevented. Therefore, it is possible to reduce or prevent the occurrence of problems such as failure in obtaining capacitance and heat generation. That is, by adopting the configuration of the present preferred embodiment described above, the connection reliability is improved.

The present invention is not limited to the configurations of the above preferred embodiments, and can be applied by appropriately modifying within a scope of the present invention. Each preferred embodiment is illustrative and partial substitutions or combinations of configurations shown in different preferred embodiments are possible. In the second preferred embodiment and the subsequent preferred embodiments, descriptions of features common to those of the first preferred embodiment are omitted, and only points which differ are described. In particular, the preferred embodiments do not sequentially refer to the same advantageous operational effects by the same configuration.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of laminated dielectric layers, a first side surface and a second side surface opposing each other in a height direction, a third side surface and a fourth side surface opposing each other in a width direction perpendicular or substantially perpendicular to the height direction, and a first end surface and a second end surface opposing each other in a length direction perpendicular or substantially perpendicular to the height direction and the width direction;
first internal electrode layers on the plurality of dielectric layers and exposed at the first end surface;
second internal electrode layers on the plurality of dielectric layers and exposed at the second end surface;
a first external electrode connected to the first internal electrode layers and provided in a vicinity of the first end surface; and
a second external electrode connected to the second internal electrode layers and provided in a vicinity of the second end surface; wherein
the first external electrode includes a first base electrode layer including a metal component and a glass component, and a first plated layer on the first base electrode layer;
the second external electrode includes a second base electrode layer including a metal component and a glass component, and a second plated layer on the second base electrode layer;
the first base electrode layer includes a first end surface-side base electrode layer on the first end surface, and a first side surface-side base electrode layer on a portion of at least one of the first, second, third, and fourth side surfaces;
the second base electrode layer includes a second end surface-side base electrode layer on the second end surface, and a second side surface-side base electrode layer on a portion of at least one of the first, second, third, and fourth side surfaces;
a proportion of the glass component in the first side surface-side base electrode layer is about 60% or more in a first range from a tip in a vicinity of the second end surface of the first side surface-side base electrode layer to a position of a length which is about 10% of a dimension in the length direction of the first side surface-side base electrode layer; and
a proportion of the glass component in the second side surface-side base electrode layer is about 60% or more in a second range from a tip in a vicinity of the first end surface of the second side surface-side base electrode layer to a position of a length which is about 10% of a dimension in the length direction of the second side surface-side base electrode layer.

2. The multilayer ceramic capacitor according to claim 1, wherein
the first side surface-side base electrode layer includes a glass component having a length which is about 60% or more of a thickness of the first side surface-side base electrode layer in at least one or more locations in the first range; and
the second side surface-side base electrode layer includes a glass component having a length which is about 60% or more of a thickness of the second side surface-side base electrode layer in at least one or more locations in the second range.

3. The multilayer ceramic capacitor according to claim 1, wherein the metal component includes Cu.

4. The multilayer ceramic capacitor according to claim 1, wherein the glass component includes at least either one of Ba or Ti.

5. The multilayer ceramic capacitor according to claim 1, wherein
a proportion of the glass component in the first end surface-side base electrode layer is about 10% or more and about 40% or less; and
a proportion of the glass component in the second end surface-side base electrode layer is about 10% or more and about 40% or less.

6. The multilayer ceramic capacitor according to claim 1, wherein each of the plurality of dielectric layers includes at least one of $BaTiO_3$, $CaTiO_3$, $SrTiO_3$, or $CaZrO_3$ as a main component.

7. The multilayer ceramic capacitor according to claim 6, wherein each of the plurality of dielectric layers includes at least one of a Mn compound, an Fe compound, a Cr compound, a Co compound, or a Ni compound as a secondary component.

8. The multilayer ceramic capacitor according to claim 1, wherein a thickness of each of the plurality of dielectric layers is about 0.5 μm or more and about 10 μm or less.

9. The multilayer ceramic capacitor according to claim 1, wherein a number of the plurality of dielectric layers is 15 or more and 700 or less.

10. The multilayer ceramic capacitor according to claim 1, wherein each of the first and second internal electrodes includes at least one of Ni, Cu, Ag, Pd, or Au, or an alloy including at least one of Ni, Cu, Ag, Pd, or Au.

11. The multilayer ceramic capacitor according to claim 1, wherein a thickness of each of the first and second internal electrodes is about 0.2 μm or more and about 2.0 μm or less.

12. The multilayer ceramic capacitor according to claim 1, wherein a total number of the first and second internal electrode layers is 15 or more and 200 or less.

13. The multilayer ceramic capacitor according to claim 1, wherein the first side surface-side base electrode layer is on all of the first, second, third, and fourth side surfaces.

14. The multilayer ceramic capacitor according to claim 1, wherein the second side surface-side base electrode layer is on all of the first, second, third, and fourth side surfaces.

15. The multilayer ceramic capacitor according to claim 1, wherein each of the first and second plated layers includes at least one of Cu, Ni, Sn, Ag, Pd, Ag—Pd alloy, or Au.

16. The multilayer ceramic capacitor according to claim 1, wherein each of the first and second plated layers includes a plurality of layers.

17. The multilayer ceramic capacitor according to claim 16, wherein each of the first and second plated layers includes a Ni plated layer and a Sn plated layer on the Ni plated layer.

18. The multilayer ceramic capacitor according to claim 1, wherein a thickness of each of the Sn plated layer and the Ni plated layer is about 2 μm or more and about 15 μm or less.

* * * * *